United States Patent
Perras et al.

(10) Patent No.: US 12,401,993 B2
(45) Date of Patent: Aug. 26, 2025

(54) SECURITY AND PRIVACY SUPPORT FOR DIRECT WIRELESS COMMUNICATIONS

(71) Applicant: InterDigital Patent Holdings, Inc., Wilmington, DE (US)

(72) Inventors: Michelle Perras, Montreal (CA); Alec Brusilovsky, Downingtown, PA (US); Xiaoyan Shi, Westmount (CA); Saad Ahmad, Montreal (CA); Samir Ferdi, Kirkland (CA)

(73) Assignee: InterDigital Patent Holdings, Inc., Wilmington, DE (US)

( * ) Notice: Subject to any disclaimer, the term of this patent is extended or adjusted under 35 U.S.C. 154(b) by 197 days.

(21) Appl. No.: 17/798,985

(22) PCT Filed: Feb. 12, 2021

(86) PCT No.: PCT/US2021/017883
§ 371 (c)(1),
(2) Date: Aug. 11, 2022

(87) PCT Pub. No.: WO2021/163507
PCT Pub. Date: Aug. 19, 2021

(65) Prior Publication Data
US 2023/0061284 A1    Mar. 2, 2023

Related U.S. Application Data

(60) Provisional application No. 62/976,205, filed on Feb. 13, 2020.

(51) Int. Cl.
*H04W 12/02*    (2009.01)
(52) U.S. Cl.
CPC .................................. *H04W 12/02* (2013.01)

(58) Field of Classification Search
CPC ....... H04W 12/02; H04W 12/06; H04W 4/40; H04W 4/023; H04W 4/70; H04W 12/08;
(Continued)

(56) References Cited

U.S. PATENT DOCUMENTS

| 11,005,708 B1 * | 5/2021 | Gheorghe | ........... H04L 41/0803 |
| 11,330,433 B2 * | 5/2022 | Torvinen | ................. H04L 9/083 |

(Continued)

OTHER PUBLICATIONS

3rd Generation Partnership Project (3GPP), S2-2000913, "Update of Link Identifier Update for Unicast Link Procedure", InterDigital, LG Electronics, Qualcomm Incorporated, SA WG2 Meeting #S2-136AH, Incheon, Korea, Jan. 13-17, 2020, 8 pages.
(Continued)

*Primary Examiner* — Kambiz Zand
*Assistant Examiner* — Afaq Ali
(74) *Attorney, Agent, or Firm* — Condo Roccia Koptiw LLP

(57) ABSTRACT

Systems, methods and instrumentalities are described herein that provide security and/or privacy support for wireless transmit receive units (WTRUs) communicating via a WTRU to WTRU relay. A source WTRU may obtain a new IP address from a relay WTRU via a link identifier update request. The source WTRU may indicate to the relay WTRU which one or more target WTRUs are to be informed of the new IP address. The source WTRU may indicate to the relay WTRU whether the target WTRU's ID(s) should be changed. The relay WTRU may send the source WTRU's new IP address to authorized target WTRUs. The source, relay, and target WTRU may use tokens to grant or receive authorizations for sharing each other's IP addresses.

15 Claims, 13 Drawing Sheets

(58) Field of Classification Search
CPC ... H04L 29/12; H04L 61/5014; H04L 61/4511
See application file for complete search history.

(56) References Cited

U.S. PATENT DOCUMENTS

| | | | | |
|---|---|---|---|---|
| 2010/0042714 | A1* | 2/2010 | Choi | H04L 61/5014 |
| | | | | 709/223 |
| 2018/0351907 | A1* | 12/2018 | Ryu | H04L 61/5046 |
| 2022/0182825 | A1* | 6/2022 | Jiang | H04L 63/0414 |
| 2022/0286820 | A1* | 9/2022 | Yoshizawa | H04L 63/162 |
| 2023/0007721 | A1* | 1/2023 | Chun | H04W 76/11 |

OTHER PUBLICATIONS

3rd Generation Partnership Project (3GPP) TR 23.752 V0.3.0, "Study on system Enhancement for Proximity Based Services (ProSe) in the 5G System (SGS) (Release 17)" Technical Specification Group Services and System Aspects, Jan. 2020, 73 pages.

3rd Generation Partnership Project (3GPP) TS 23.287 V16.2.0, "Technical Specification Group Services and System Aspects, Architecture Enhancements for 5G System (5GS) to Support Vehicle-to-Everything (V2X) Services (Release 16)", Mar. 2020, pp. 1-53.

Mrugalski et al., "Dynamic Host Configuration Protocol for IPV6 (DHCPv6) Bis", Dynamic Host Configuration (DHC), Internet-Draft, Obsoletes: 3315,3633,3736,7083,7550 (If Approved), Intended Status: Standards Track, Expires: Aug. 5, 2016, Feb. 2, 2016, pp. 1-127.

\* cited by examiner

SECURITY AND PRIVACY SUPPORT FOR DIRECT WIRELESS COMMUNICATIONS

CROSS-REFERENCE TO RELATED APPLICATIONS

This application is the National Stage Entry under 35 U.S.C. § 371 of Patent Cooperation Treaty Application No. PCT/US2021/017883, filed Feb. 12, 2021, which claims the benefit of Provisional U.S. Patent Application No. 62/976, 205, filed Feb. 13, 2020, the disclosure of which is incorporated herein by reference in its entirety.

BACKGROUND

Mobile communication technologies continue to evolve. A fifth generation may be referred to as 5G. Previous (legacy) generations of mobile communication technologies may include fourth-generation (4G) or long term evolution (LTE) technologies. Wireless transmit receive units (WTRUs) that are 4G LTE or 5G capable may communicate directly with each other via a unicast sidelink (e.g., including a vehicle-to-everything or V2X link) and/or through a relay WTRU. Privacy and/or security issues may need to be addressed to facilitate the communications among these WTRUs.

SUMMARY

Systems, methods, and instrumentalities are described herein that provide privacy and/or security support for WTRUs communicating via a sidelink. A WTRU as described herein (e.g., a source WTRU or S-WTRU) may comprise a processor that is configured to communicate with a first target WTRU (e.g., T-WTRU) using a first internet protocol (IP) identifier (e.g., such as an IP address). The processor may be further configured to determine that the first IP identifier is to be changed (e.g., based on the expiration of a timer), and transmit a message to a relay WTRU (e.g., an R-WTRU) requesting that the relay WTRU allocate a second IP identifier to the WTRU. The WTRU may receive a response from the relay WTRU, wherein the response may include the second IP identifier allocated to the WTRU.

The source WTRU that requests the IP identifier change may also provide the relay WTRU with a list of target WTRUs (e.g., including the first target WTRU) that are to be informed about the source WTRU's IP identifier change. The source WTRU may authorize the relay WTRU to share the S-WTRU's new IP identifier, for example, by providing the relay WTRU with a token that the relay WTRU may use to verify a target WTRU. The S-WTRU may also request that the relay WTRU change the IP identifier(s) (e.g., IP address(es)) of one or more of the target WTRUs and/or that the relay WTRU provide the IP identifier(s) of the target WTRUs to the source WTRU.

The IP identifier change described herein may be accomplished via respective unicast link(s) (e.g., PC5 links) between the source WTRU and the relay WTRU, and between the relay WTRU and the one or more target WTRUs. The IP identifier change may be accomplished using one or more of a link identifier update (LIU) request message, LIU response message, and/or LIU acknowledgment message transmitted over the unicast link(s).

DETAILED DESCRIPTION

Figure 1A:
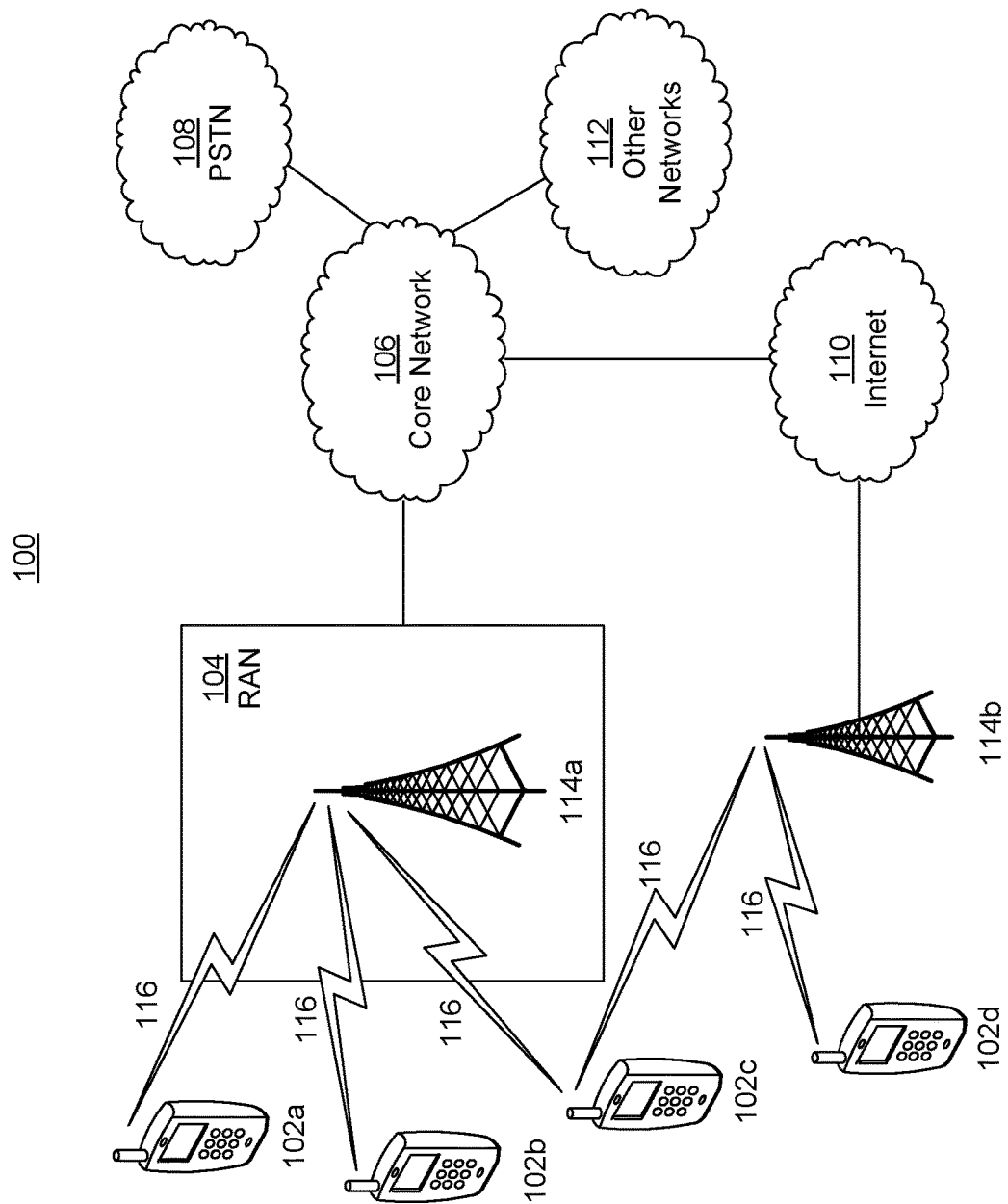
FIG. 1A is a system diagram illustrating an example communications system in which one or more disclosed embodiments may be implemented.

FIG. 1A is a diagram illustrating an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), zero-tail unique-word DFT-Spread OFDM (ZT UW DTS-s OFDM), unique word OFDM (UW-OFDM), resource block-filtered OFDM, filter bank multicarrier (FBMC), and the like.

As shown in FIG. 1A, the communications system 100 may include wireless transmit/receive units (WTRUs) 102a, 102b, 102c, 102d, a RAN 104/113, a CN 106/115, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d, any of which may be referred to as a "station" and/or a "STA", may be configured to transmit and/or receive wireless signals and may include a user equipment (UE), a mobile station, a fixed or mobile subscriber unit, a subscription-based unit, a pager, a cellular telephone, a personal digital assistant (PDA), a smartphone, a laptop, a netbook, a personal computer, a wireless sensor, a hotspot or Mi-Fi device, an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. Any of the WTRUs 102a, 102b, 102c and 102d may be interchangeably referred to as a UE.

The communications systems 100 may also include a base station 114a and/or a base station 114b. Each of the base stations 114a, 114b may be any type of device configured to wirelessly interface with at least one of the WTRUs 102a, 102b, 102c, 102d to facilitate access to one or more communication networks, such as the CN 106/115, the Internet 110, and/or the other networks 112. By way of example, the base stations 114a, 114b may be a base transceiver station (BTS), a Node-B, an eNode B, a Home Node B, a Home eNode B, a gNB, a NR NodeB, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104/113, which may also include other base stations and/or network elements (not shown), such as a base station controller (BSC), a radio network controller (RNC), relay nodes, etc. The base station 114a and/or the base station 114b may be configured to transmit and/or receive wireless signals on one or more carrier frequencies, which may be referred to as a cell (not shown). These frequencies may be in licensed spectrum, unlicensed spectrum, or a combination of licensed and unlicensed spectrum. A cell may provide coverage for a wireless service to a specific geographical area that may be relatively fixed or that may change over time. The cell may further be divided into cell sectors. For example, the cell associated with the base station 114a may be divided into three sectors. Thus, in one embodiment, the base station 114a may include three transceivers, i.e., one for each sector of the cell. In an embodiment, the base station 114a may employ multiple-input multiple output (MIMO) technology and may utilize multiple transceivers for each sector of the cell. For example, beamforming may be used to transmit and/or receive signals in desired spatial directions.

The base stations 114a, 114b may communicate with one or more of the WTRUs 102a, 102b, 102c, 102d over an air interface 116, which may be any suitable wireless communication link (e.g., radio frequency (RF), microwave, centimeter wave, micrometer wave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104/113 and the WTRUs 102a, 102b, 102c may implement a radio technology such as Universal Mobile Telecommunications System (UMTS) Terrestrial Radio Access (UTRA), which may establish the air interface 115/116/117 using wideband CDMA (WCDMA). WCDMA may include communication protocols such as High-Speed Packet Access (HSPA) and/or Evolved HSPA (HSPA+). HSPA may include High-Speed Downlink (DL) Packet Access (HSDPA) and/or High-Speed UL Packet Access (HSUPA).

In an embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A) and/or LTE-Advanced Pro (LTE-A Pro).

In an embodiment, the base station 114a and the WTRUs 102a, 102b, 102c may implement a radio technology such as NR Radio Access, which may establish the air interface 116 using New Radio (NR).

In an embodiment, the base station 114a and the WTRUs 102a, 102b, 102c may implement multiple radio access technologies. For example, the base station 114a and the WTRUs 102a, 102b, 102c may implement LTE radio access and NR radio access together, for instance using dual connectivity (DC) principles. Thus, the air interface utilized by WTRUs 102a, 102b, 102c may be characterized by multiple types of radio access technologies and/or transmissions sent to/from multiple types of base stations (e.g., an eNB and a gNB).

In other embodiments, the base station 114a and the WTRUs 102a, 102b, 102c may implement radio technologies such as IEEE 802.11 (i.e., Wireless Fidelity (WiFi), IEEE 802.16 (i.e., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, an industrial facility, an air corridor (e.g., for use by drones), a roadway, and the like. In one embodiment, the base station 114b and the WTRUs 102c, 102d may implement a radio technology such as IEEE 802.11 to establish a wireless local area network (WLAN). In an embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, LTE-A Pro, NR etc.) to establish a picocell or femtocell. As shown in FIG. 1A, the base station 114b may have a direct connection to the Internet 110. Thus, the base station 114b may not be required to access the Internet 110 via the CN 106/115.

The RAN 104/113 may be in communication with the CN 106/115, which may be any type of network configured to provide voice, data, applications, and/or voice over internet protocol (VoIP) services to one or more of the WTRUs 102a, 102b, 102c, 102d. The data may have varying quality of service (QoS) requirements, such as differing throughput requirements, latency requirements, error tolerance requirements, reliability requirements, data throughput requirements, mobility requirements, and the like. The CN 106/115 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104/113 and/or the CN 106/115 may be in direct or indirect communication with other RANs that employ the same RAT as the RAN 104/113 or a different RAT. For example, in addition to being connected to the RAN 104/113, which may be utilizing a NR radio technology, the CN 106/115 may also be in communication with another RAN (not shown) employing a GSM, UMTS, CDMA 2000, WiMAX, E-UTRA, or WiFi radio technology.

The CN 106/115 may also serve as a gateway for the WTRUs 102a, 102b, 102c, 102d to access the PSTN 108, the Internet 110, and/or the other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and/or the internet protocol (IP) in the TCP/IP internet protocol suite. The networks 112 may include wired and/or wireless communications networks owned and/or operated by other service providers. For example, the networks 112 may include another CN connected to one or more RANs, which may employ the same RAT as the RAN 104/113 or a different RAT.

Some or all of the WTRUs 102a, 102b, 102c, 102d in the communications system 100 may include multi-mode capabilities (e.g., the WTRUs 102a, 102b, 102c, 102d may include multiple transceivers for communicating with different wireless networks over different wireless links). For example, the WTRU 102c shown in FIG. 1A may be configured to communicate with the base station 114a, which may employ a cellular-based radio technology, and with the base station 114b, which may employ an IEEE 802 radio technology.

Figure 1B:
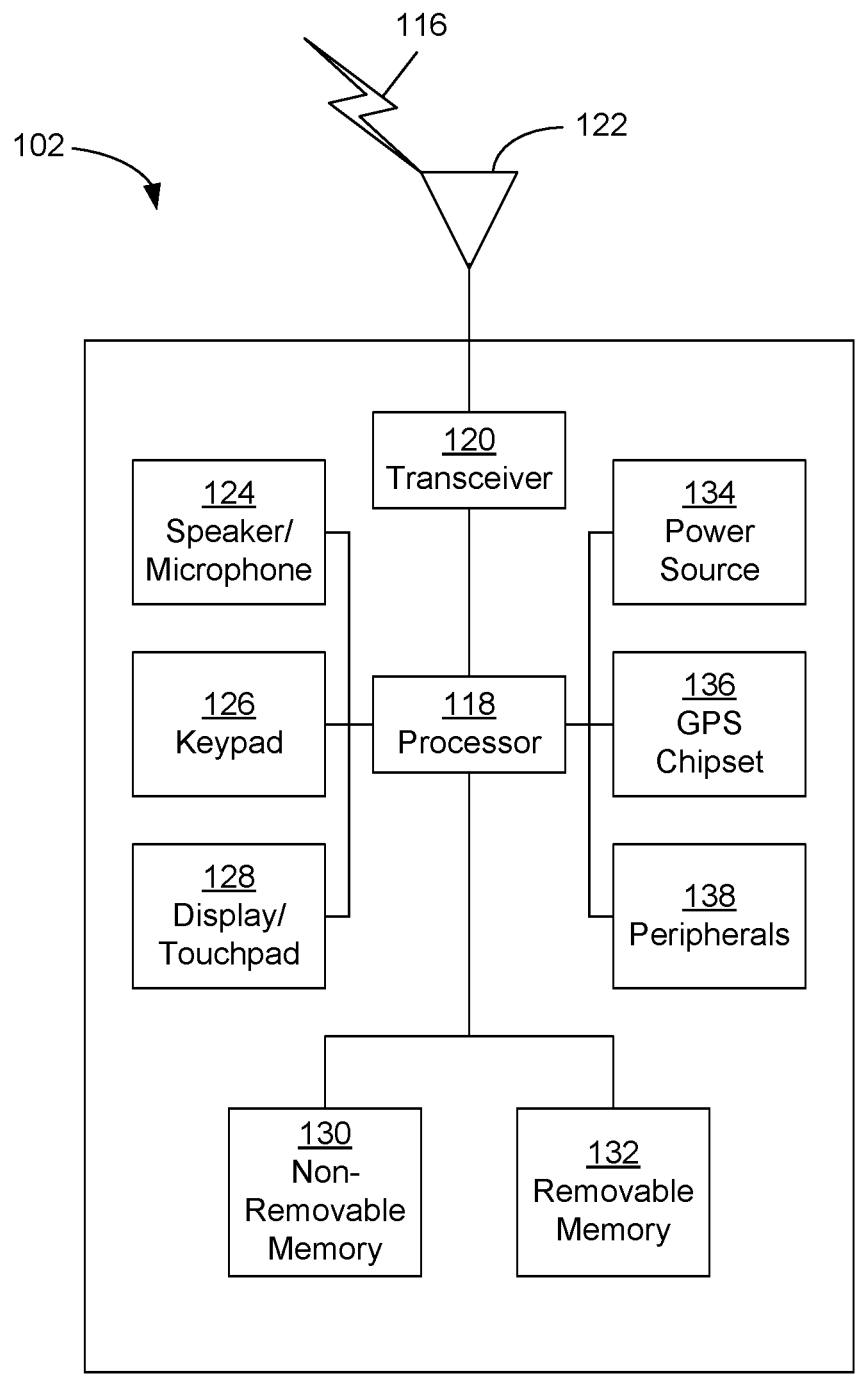
FIG. 1B is a system diagram illustrating an example wireless transmit/receive unit (WTRU) that may be used within the communications system illustrated in FIG. 1A according to an embodiment.

FIG. 1B is a system diagram illustrating an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and/or other peripherals 138, among others. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In yet another embodiment, the transmit/receive element 122 may be configured to transmit and/or receive both RF and light signals. It will be appreciated that the transmit/receive element 122 may be configured to transmit and/or receive any combination of wireless signals.

Although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as NR and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134 and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs and/or video), a universal serial bus (USB) port, a vibration device, a television transceiver, a hands free headset, a Bluetooth® module, a frequency modulated (FM) radio unit, a digital music player, a media player, a video game player module, an Internet browser, a Virtual Reality and/or Augmented Reality (VR/AR) device, an activity tracker, and the like. The peripherals 138 may include one or more sensors, the sensors may be one or more of a gyroscope, an accelerometer, a hall effect sensor, a magnetometer, an orientation sensor, a proximity sensor, a temperature sensor, a time sensor; a geolocation sensor; an altimeter, a light sensor, a touch sensor, a magnetometer, a barometer, a gesture sensor, a biometric sensor, and/or a humidity sensor.

The WTRU 102 may include a full duplex radio for which transmission and reception of some or all of the signals (e.g., associated with particular subframes for both the UL (e.g., for transmission) and downlink (e.g., for reception) may be concurrent and/or simultaneous. The full duplex radio may include an interference management unit to reduce and or substantially eliminate self-interference via either hardware (e.g., a choke) or signal processing via a processor (e.g., a separate processor (not shown) or via processor 118). In an embodiment, the WRTU 102 may include a half-duplex radio for which transmission and reception of some or all of the signals (e.g., associated with particular subframes for either the UL (e.g., for transmission) or the downlink (e.g., for reception)).

Figure 1C:
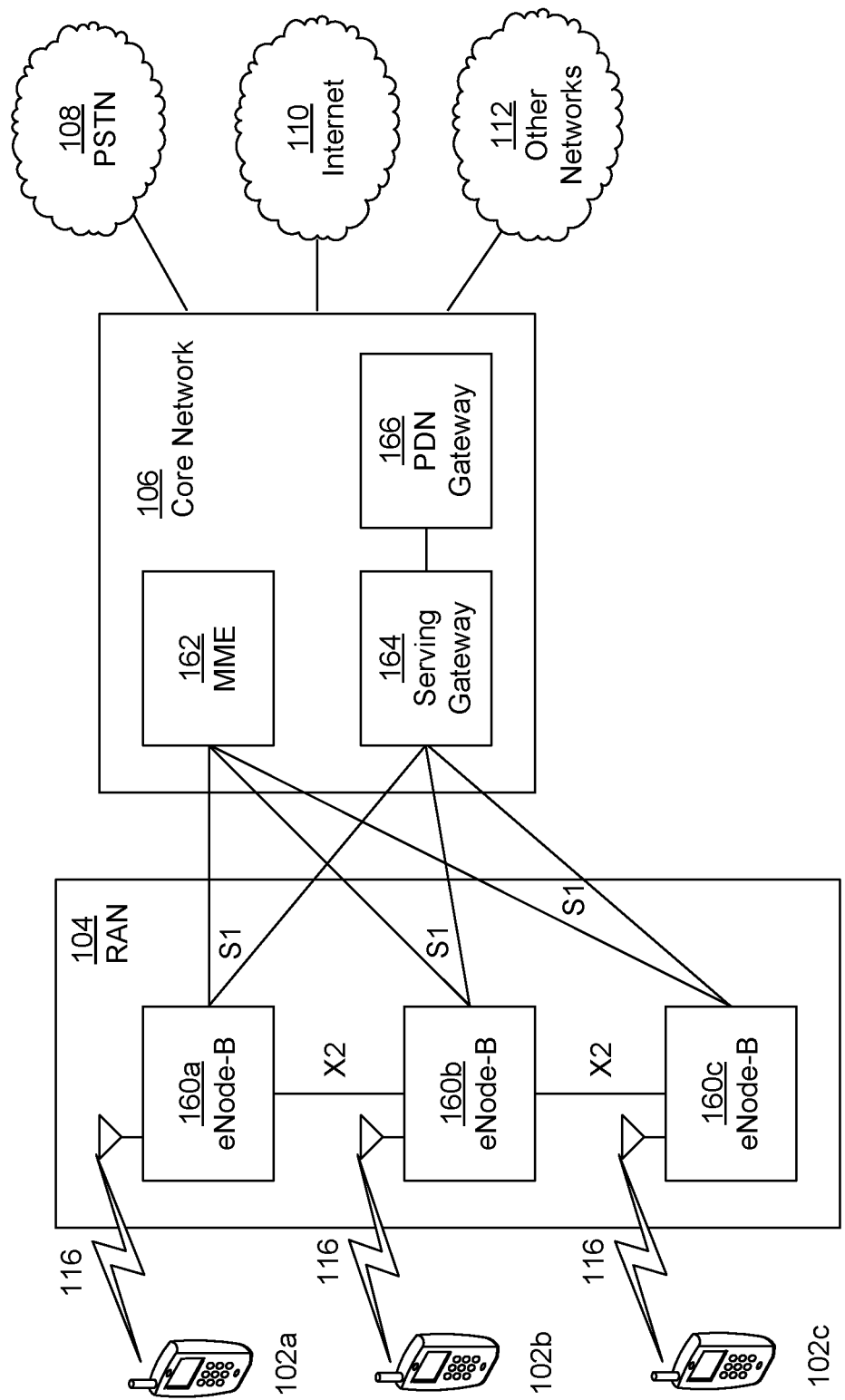
FIG. 1C is a system diagram illustrating an example radio access network (RAN) and an example core network (CN) that may be used within the communications system illustrated in FIG. 1A according to an embodiment.

FIG. 1C is a system diagram illustrating the RAN 104 and the CN 106 according to an embodiment. As noted above, the RAN 104 may employ an E-UTRA radio technology to communicate with the WTRUs 102a, 102b, 102c over the air interface 116. The RAN 104 may also be in communication with the CN 106.

The RAN 104 may include eNode-Bs 160a, 160b, 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In one embodiment, the eNode-Bs 160a, 160b, 160c may implement MIMO technology. Thus, the eNode-B 160a, for example, may use multiple antennas to transmit wireless signals to, and/or receive wireless signals from, the WTRU 102a.

Each of the eNode-Bs 160a, 160b, 160c may be associated with a particular cell (not shown) and may be configured to handle radio resource management decisions, handover decisions, scheduling of users in the UL and/or DL, and the like. As shown in FIG. 1C, the eNode-Bs 160a, 160b, 160c may communicate with one another over an X2 interface.

The CN 106 shown in FIG. 1C may include a mobility management entity (MME) 162, a serving gateway (SGW) 164, and a packet data network (PDN) gateway (or PGW) 166. While each of the foregoing elements is depicted as part of the CN 106, it will be appreciated that any of these elements may be owned and/or operated by an entity other than the CN operator.

The MME 162 may be connected to each of the eNode-Bs 162a, 162b, 162c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may provide a control plane function for switching between the RAN 104 and other RANs (not shown) that employ other radio technologies, such as GSM and/or WCDMA.

The SGW 164 may be connected to each of the eNode Bs 160a, 160b, 160c in the RAN 104 via the S1 interface. The SGW 164 may generally route and forward user data packets to/from the WTRUs 102a, 102b, 102c. The SGW 164 may perform other functions, such as anchoring user planes during inter-eNode B handovers, triggering paging when DL data is available for the WTRUs 102a, 102b, 102c, managing and storing contexts of the WTRUs 102a, 102b, 102c, and the like.

The SGW 164 may be connected to the PGW 166, which may provide the WTRUs 102a, 102b, 102c with access to packet-switched networks, such as the Internet 110, to facilitate communications between the WTRUs 102a, 102b, 102c and IP-enabled devices.

The CN 106 may facilitate communications with other networks. For example, the CN 106 may provide the WTRUs 102a, 102b, 102c with access to circuit-switched networks, such as the PSTN 108, to facilitate communications between the WTRUs 102a, 102b, 102c and traditional land-line communications devices. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102a, 102b, 102c with access to the other networks 112, which may include other wired and/or wireless networks that are owned and/or operated by other service providers.

Although the WTRU is described in FIGS. 1A-1D as a wireless terminal, it is contemplated that in certain representative embodiments that such a terminal may use (e.g., temporarily or permanently) wired communication interfaces with the communication network.

In representative embodiments, the other network 112 may be a WLAN.

A WLAN in Infrastructure Basic Service Set (BSS) mode may have an Access Point (AP) for the BSS and one or more stations (STAs) associated with the AP. The AP may have an access or an interface to a Distribution System (DS) or another type of wired/wireless network that carries traffic in to and/or out of the BSS. Traffic to STAs that originates from outside the BSS may arrive through the AP and may be delivered to the STAs. Traffic originating from STAs to destinations outside the BSS may be sent to the AP to be delivered to respective destinations. Traffic between STAs within the BSS may be sent through the AP, for example, where the source STA may send traffic to the AP and the AP may deliver the traffic to the destination STA. The traffic between STAs within a BSS may be considered and/or referred to as peer-to-peer traffic. The peer-to-peer traffic may be sent between (e.g., directly between) the source and destination STAs with a direct link setup (DLS). In certain representative embodiments, the DLS may use an 802.11e DLS or an 802.11z tunneled DLS (TDLS). A WLAN using an Independent BSS (IBSS) mode may not have an AP, and the STAs (e.g., all of the STAs) within or using the IBSS may communicate directly with each other. The IBSS mode of communication may sometimes be referred to herein as an "ad-hoc" mode of communication.

When using the 802.11ac infrastructure mode of operation or a similar mode of operations, the AP may transmit a beacon on a fixed channel, such as a primary channel. The primary channel may be a fixed width (e.g., 20 MHz wide bandwidth) or a dynamically set width via signaling. The primary channel may be the operating channel of the BSS and may be used by the STAs to establish a connection with the AP. In certain representative embodiments, Carrier Sense Multiple Access with Collision Avoidance (CSMA/CA) may be implemented, for example in in 802.11 systems. For CSMA/CA, the STAs (e.g., every STA), including the AP, may sense the primary channel. If the primary channel is sensed/detected and/or determined to be busy by a particular STA, the particular STA may back off. One STA (e.g., only one station) may transmit at any given time in a given BSS.

High Throughput (HT) STAs may use a 40 MHz wide channel for communication, for example, via a combination of the primary 20 MHz channel with an adjacent or nonadjacent 20 MHz channel to form a 40 MHz wide channel.

Very High Throughput (VHT) STAs may support 20 MHz, 40 MHz, 80 MHz, and/or 160 MHz wide channels. The 40 MHz, and/or 80 MHz, channels may be formed by combining contiguous 20 MHz channels. A 160 MHz channel may be formed by combining 8 contiguous 20 MHz channels, or by combining two non-contiguous 80 MHz channels, which may be referred to as an 80+80 configuration. For the 80+80 configuration, the data, after channel encoding, may be passed through a segment parser that may divide the data into two streams. Inverse Fast Fourier Transform (IFFT) processing, and time domain processing, may be done on each stream separately. The streams may be mapped on to the two 80 MHz channels, and the data may be transmitted by a transmitting STA. At the receiver of the receiving STA, the above described operation for the 80+80 configuration may be reversed, and the combined data may be sent to the Medium Access Control (MAC).

Sub 1 GHz modes of operation are supported by 802.11af and 802.11ah. The channel operating bandwidths, and carriers, are reduced in 802.11af and 802.11ah relative to those used in 802.11n, and 802.11ac. 802.11af supports 5 MHz, 10 MHz and 20 MHz bandwidths in the TV White Space (TVWS) spectrum, and 802.11ah supports 1 MHz, 2 MHz, 4 MHz, 8 MHz, and 16 MHz bandwidths using non-TVWS spectrum. According to a representative embodiment, 802.11ah may support Meter Type Control/Machine-Type Communications, such as MTC devices in a macro coverage area. MTC devices may have certain capabilities, for example, limited capabilities including support for (e.g., only support for) certain and/or limited bandwidths. The MTC devices may include a battery with a battery life above a threshold (e.g., to maintain a very long battery life).

WLAN systems, which may support multiple channels, and channel bandwidths, such as 802.11n, 802.11ac, 802.11af, and 802.11ah, include a channel which may be designated as the primary channel. The primary channel may have a bandwidth equal to the largest common operating bandwidth supported by all STAs in the BSS. The bandwidth of the primary channel may be set and/or limited by a STA, from among all STAs in operating in a BSS, which supports the smallest bandwidth operating mode. In the example of 802.11ah, the primary channel may be 1 MHz wide for STAs (e.g., MTC type devices) that support (e.g., only support) a 1 MHz mode, even if the AP, and other STAs in the BSS support 2 MHz, 4 MHz, 8 MHz, 16 MHz, and/or other channel bandwidth operating modes. Carrier sensing and/or Network Allocation Vector (NAV) settings may depend on the status of the primary channel. If the primary channel is busy, for example, due to a STA (which supports only a 1 MHz operating mode), transmitting to the AP, the entire available frequency bands may be considered busy even though a majority of the frequency bands remains idle and may be available.

In the United States, the available frequency bands, which may be used by 802.11ah, are from 902 MHz to 928 MHz. In Korea, the available frequency bands are from 917.5 MHz to 923.5 MHz. In Japan, the available frequency bands are from 916.5 MHz to 927.5 MHz. The total bandwidth available for 802.11ah is 6 MHz to 26 MHz depending on the country code.

Figure 1D:
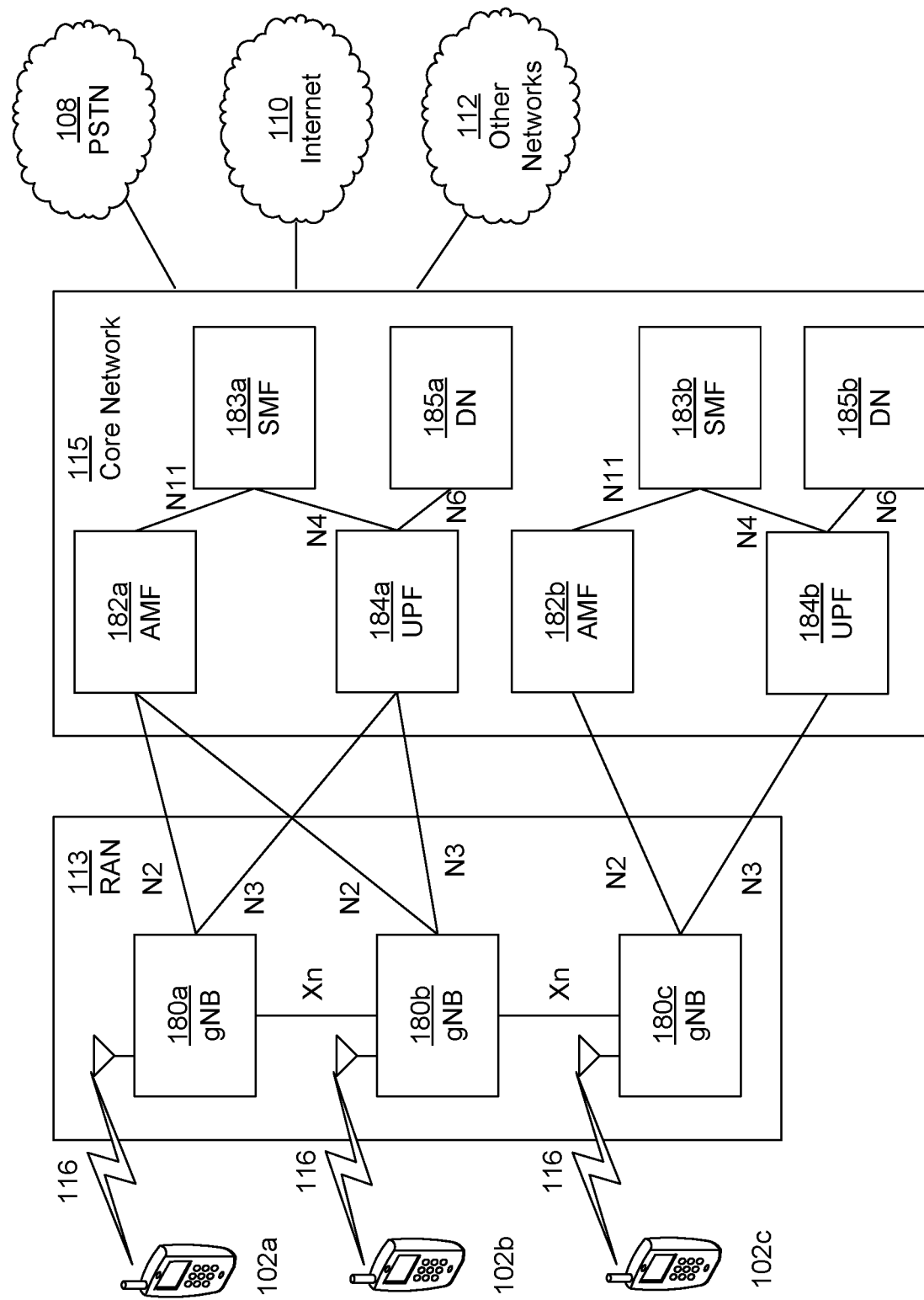
FIG. 1D is a system diagram illustrating a further example RAN and a further example CN that may be used within the communications system illustrated in FIG. 1A according to an embodiment.

FIG. 1D is a system diagram illustrating the RAN 113 and the CN 115 according to an embodiment. As noted above, the RAN 113 may employ an NR radio technology to communicate with the WTRUs 102a, 102b, 102c over the air interface 116. The RAN 113 may also be in communication with the CN 115.

The RAN 113 may include gNBs 180a, 180b, 180c, though it will be appreciated that the RAN 113 may include any number of gNBs while remaining consistent with an embodiment. The gNBs 180a, 180b, 180c may each include one or more transceivers for communicating with the WTRUs 102a, 102b, 102c over the air interface 116. In one embodiment, the gNBs 180a, 180b, 180c may implement MIMO technology. For example, gNBs 180a, 108b may utilize beamforming to transmit signals to and/or receive signals from the gNBs 180a, 180b, 180c. Thus, the gNB 180a, for example, may use multiple antennas to transmit wireless signals to, and/or receive wireless signals from, the WTRU 102a. In an embodiment, the gNBs 180a, 180b, 180c may implement carrier aggregation technology. For example, the gNB 180a may transmit multiple component carriers to the WTRU 102a (not shown). A subset of these component carriers may be on unlicensed spectrum while the remaining component carriers may be on licensed spectrum. In an embodiment, the gNBs 180a, 180b, 180c may implement Coordinated Multi-Point (CoMP) technology. For example, WTRU 102a may receive coordinated transmissions from gNB 180a and gNB 180b (and/or gNB 180c).

The WTRUs 102a, 102b, 102c may communicate with gNBs 180a, 180b, 180c using transmissions associated with a scalable numerology. For example, the OFDM symbol spacing and/or OFDM subcarrier spacing may vary for different transmissions, different cells, and/or different portions of the wireless transmission spectrum. The WTRUs 102a, 102b, 102c may communicate with gNBs 180a, 180b, 180c using subframe or transmission time intervals (TTIs) of various or scalable lengths (e.g., containing varying number of OFDM symbols and/or lasting varying lengths of absolute time).

The gNBs 180a, 180b, 180c may be configured to communicate with the WTRUs 102a, 102b, 102c in a standalone configuration and/or a non-standalone configuration. In the standalone configuration, WTRUs 102a, 102b, 102c may communicate with gNBs 180a, 180b, 180c without also accessing other RANs (e.g., such as eNode-Bs 160a, 160b, 160c). In the standalone configuration, WTRUs 102a, 102b, 102c may utilize one or more of gNBs 180a, 180b, 180c as a mobility anchor point. In the standalone configuration, WTRUs 102a, 102b, 102c may communicate with gNBs 180a, 180b, 180c using signals in an unlicensed band. In a non-standalone configuration WTRUs 102a, 102b, 102c may communicate with/connect to gNBs 180a, 180b, 180c while also communicating with/connecting to another RAN such as eNode-Bs 160a, 160b, 160c. For example, WTRUs 102a, 102b, 102c may implement DC principles to communicate with one or more gNBs 180a, 180b, 180c and one or more eNode-Bs 160a, 160b, 160c substantially simultaneously. In the non-standalone configuration, eNode-Bs 160a, 160b, 160c may serve as a mobility anchor for WTRUs 102a, 102b, 102c and gNBs 180a, 180b, 180c may provide additional coverage and/or throughput for servicing WTRUs 102a, 102b, 102c.

Each of the gNBs 180a, 180b, 180c may be associated with a particular cell (not shown) and may be configured to handle radio resource management decisions, handover decisions, scheduling of users in the UL and/or DL, support of network slicing, dual connectivity, interworking between NR and E-UTRA, routing of user plane data towards User Plane Function (UPF) 184a, 184b, routing of control plane information towards Access and Mobility Management Function (AMF) 182a, 182b and the like. As shown in FIG. 1D, the gNBs 180a, 180b, 180c may communicate with one another over an Xn interface.

The CN 115 shown in FIG. 1D may include at least one AMF 182a, 182b, at least one UPF 184a,184b, at least one Session Management Function (SMF) 183a, 183b, and possibly a Data Network (DN) 185a, 185b. While each of the foregoing elements are depicted as part of the CN 115, it will be appreciated that any of these elements may be owned and/or operated by an entity other than the CN operator.

The AMF 182a, 182b may be connected to one or more of the gNBs 180a, 180b, 180c in the RAN 113 via an N2 interface and may serve as a control node. For example, the AMF 182a, 182b may be responsible for authenticating users of the WTRUs 102a, 102b, 102c, support for network slicing (e.g., handling of different PDU sessions with different requirements), selecting a particular SMF 183a, 183b, management of the registration area, termination of NAS signaling, mobility management, and the like. Network slicing may be used by the AMF 182a, 182b, in order to customize CN support for WTRUs 102a, 102b, 102c based on the types of services being utilized WTRUs 102a, 102b, 102c. For example, different network slices may be established for different use cases such as services relying on ultra-reliable low latency (URLLC) access, services relying on enhanced massive mobile broadband (eMBB) access, services for machine type communication (MTC) access, and/or the like. The AMF 162 may provide a control plane function for switching between the RAN 113 and other RANs (not shown) that employ other radio technologies, such as LTE, LTE-A, LTE-A Pro, and/or non-3GPP access technologies such as WiFi.

The SMF 183a, 183b may be connected to an AMF 182a, 182b in the CN 115 via an N11 interface. The SMF 183a, 183b may also be connected to a UPF 184a, 184b in the CN 115 via an N4 interface. The SMF 183a, 183b may select and control the UPF 184a, 184b and configure the routing of traffic through the UPF 184a, 184b. The SMF 183a, 183b may perform other functions, such as managing and allocating UE IP address, managing PDU sessions, controlling policy enforcement and QoS, providing downlink data notifications, and the like. A PDU session type may be IP-based, non-IP based, Ethernet-based, and the like.

The UPF 184a, 184b may be connected to one or more of the gNBs 180a, 180b, 180c in the RAN 113 via an N3 interface, which may provide the WTRUs 102a, 102b, 102c with access to packet-switched networks, such as the Internet 110, to facilitate communications between the WTRUs 102a, 102b, 102c and IP-enabled devices. The UPF 184, 184b may perform other functions, such as routing and forwarding packets, enforcing user plane policies, supporting multi-homed PDU sessions, handling user plane QoS, buffering downlink packets, providing mobility anchoring, and the like.

The CN 115 may facilitate communications with other networks. For example, the CN 115 may include, or may communicate with, an IP gateway (e.g., an IP multimedia subsystem (IMS) server) that serves as an interface between the CN 115 and the PSTN 108. In addition, the CN 115 may provide the WTRUs 102a, 102b, 102c with access to the other networks 112, which may include other wired and/or wireless networks that are owned and/or operated by other service providers. In one embodiment, the WTRUs 102a, 102b, 102c may be connected to a local Data Network (DN) 185a, 185b through the UPF 184a, 184b via the N3 interface to the UPF 184a, 184b and an N6 interface between the UPF 184a, 184b and the DN 185a, 185b.

In view of FIGS. 1A-1D, and the corresponding description of FIGS. 1A-1D, one or more, or all, of the functions described herein with regard to one or more of: WTRU 102a-d, Base Station 114a-b, eNode-B 160a-c, MME 162, SGW 164, PGW 166, gNB 180a-c, AMF 182a-b, UPF 184a-b, SMF 183a-b, DN 185a-b, and/or any other device(s) described herein, may be performed by one or more emulation devices (not shown). The emulation devices may be one or more devices configured to emulate one or more, or all, of the functions described herein. For example, the emulation devices may be used to test other devices and/or to simulate network and/or WTRU functions.

The emulation devices may be designed to implement one or more tests of other devices in a lab environment and/or in an operator network environment. For example, the one or more emulation devices may perform the one or more, or all, functions while being fully or partially implemented and/or deployed as part of a wired and/or wireless communication network in order to test other devices within the communication network. The one or more emulation devices may perform the one or more, or all, functions while being temporarily implemented/deployed as part of a wired and/or wireless communication network. The emulation device may be directly coupled to another device for purposes of testing and/or may performing testing using over-the-air wireless communications.

The one or more emulation devices may perform the one or more, including all, functions while not being implemented/deployed as part of a wired and/or wireless communication network. For example, the emulation devices may be utilized in a testing scenario in a testing laboratory and/or a non-deployed (e.g., testing) wired and/or wireless communication network in order to implement testing of one or more components. The one or more emulation devices may be test equipment. Direct RF coupling and/or wireless communications via RF circuitry (e.g., which may include one or more antennas) may be used by the emulation devices to transmit and/or receive data.

Discovery and/or communication among peer WTRUs (e.g., device-to-device (D2D) discovery and communication) may be performed using a proximity service (ProSe). Such a service may allow for transfer of data (e.g., streaming) at high data transfer rates, provision of localized hotspots for Internet connectivity, and/or the like. A WTRU-to-WTRU relay may be used to support ProSe. Such a WTRU-to-WTRU relay may comprise a WTRU that is configured to behave/operate as a relay between two or more peer WTRUs. WTRU-to-WTRU may be used interchangeably herein with device-to-device or D2D, and D2D may be used interchangeably herein with sidelink and/or V2X.

Figure 2:
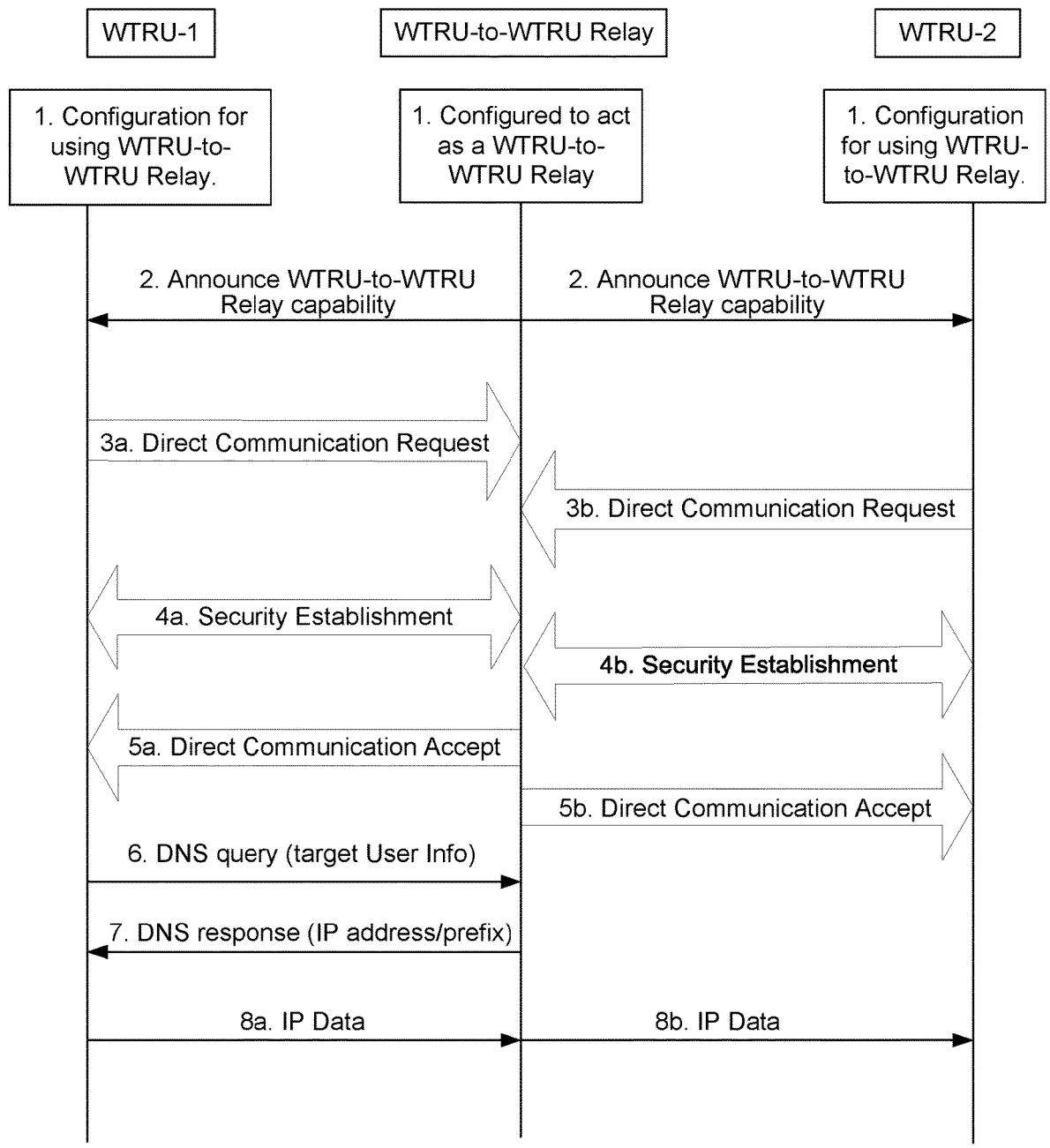
FIG. 2 is a diagram illustrating an example of performing IP routing via a WTRU-to-WTRU relay.

FIG. 2 illustrates an example of a WTRU-to-WTRU relay (e.g., a ProSe 5G WTRU-to-WTRU relay) configured to communicate with a source WTRU (e.g., WTRU-1 in the figure) and a target WTRU (e.g., WTRU-2 in the figure) utilizing IP routing. The source and/or the target WTRU may be configured to establish respective unicast L2 links (e.g., PC5 unicast links) with the WTRU-to-WTRU relay, for example, by performing one or more of the actions shown as 1-5b (e.g., including announcement based WTRU-to-WTRU relay discovery shown at 1a and 1b). The relay may (e.g., during establishment of the unicast L2 links) allocate (e.g., assign) an IP identifier (e.g., IP address, IP prefix, etc.) to the source WTRU (and/or the target WTRU), and may store an association of the source WTRU's user information with the IP identifier allocated to the source WTRU in one or more DNS entries (e.g., the relay may act as a DNS server for the source WTRU and/or the target WTRU). The source WTRU may discover a ProSe service via the WTRU-to-WTRU relay, for example, before or while communicating with the target WTRU. The source WTRU may send (e.g., over the unicast link established with the relay) a DNS query regarding the target WTRU and/or the ProSe service to the relay at 6. The DNS query may include, for example, user information associated with the target WTRU. In response to receiving the DNS query, the relay may, at 7, return an IP identifier (e.g., IP address or prefix) associated with the target WTRU or the ProSe service to the source WTRU, for example, via a DNS response message.

The source WTRU may transmit IP data or non-IP data encapsulated in IP packets to the target WTRU, for example, in response to receiving the IP address/prefix of the target WTRU from the relay. The transmission of the IP data or IP packets may utilize the unicast L2 link between the source WTRU and the relay (e.g., at 8a), and the unicast L2 link between the relay and the target WTRU (e.g., at 8b). The WTRU-to-WTRU relay may act as an IP router that forwards the data packets from the source WTRU to the target WTRU, and the unicast L2 links (e.g., each unicast L2 link associated with the ProSe service) may operate as IP interfaces between the source WTRU and the target WTRU.

Although FIG. 2 shows the source and target WTRUs communicating via one WTRU-to-WTRU relay, there may be multiple WTRU-to-WTRU relays in the proximity of the source WTRU, and the source WTRU may establish respective links with the multiple relays and select one of the multiple relays to use to communicate with the target WTRU. The selection may be based on WTRU implementation. In examples, the source WTRU may send respective DNS queries to the multiple relays, and may select the first relay that returns a positive response (e.g., the first response that indicates the IP address of the target WTRU) to the DNS query.

Link identifier updates may be performed for a unicast link (e.g., in association with enhanced vehicle to everything (eV2X) communication). Identifiers such as application ID, application layer ID, source layer-2 (L2) ID, and/or IP address/prefix used for a direct peer-to-peer unicast mode of V2X or eV2X communication (e.g., over a PC5 reference point) may be changed over time (e.g., due to privacy reasons). For example, operations may be performed to update and/or exchange identifiers between a source and a target WTRU that are associated with a unicast link before the source WTRU and target WTRU begin to use the identifiers. This way, service interruptions between the source and target WTRU may be prevented. An update to the identifier(s) of the source WTRU may cause the target WTRU to change its corresponding identifier(s) (e.g., such as an L2 ID and/or IP address/prefix if the unicast link between the source and target is used for IP communications). When referred to herein, an application ID may correspond to an identifier of an application and an application layer ID may correspond to an identifier assigned to a WTRU in association with an application (e.g., an application layer ID of a WTRU may be used by an application to identify the WTRU). An application and an application layer may be used interchangeably herein.

Figure 3:
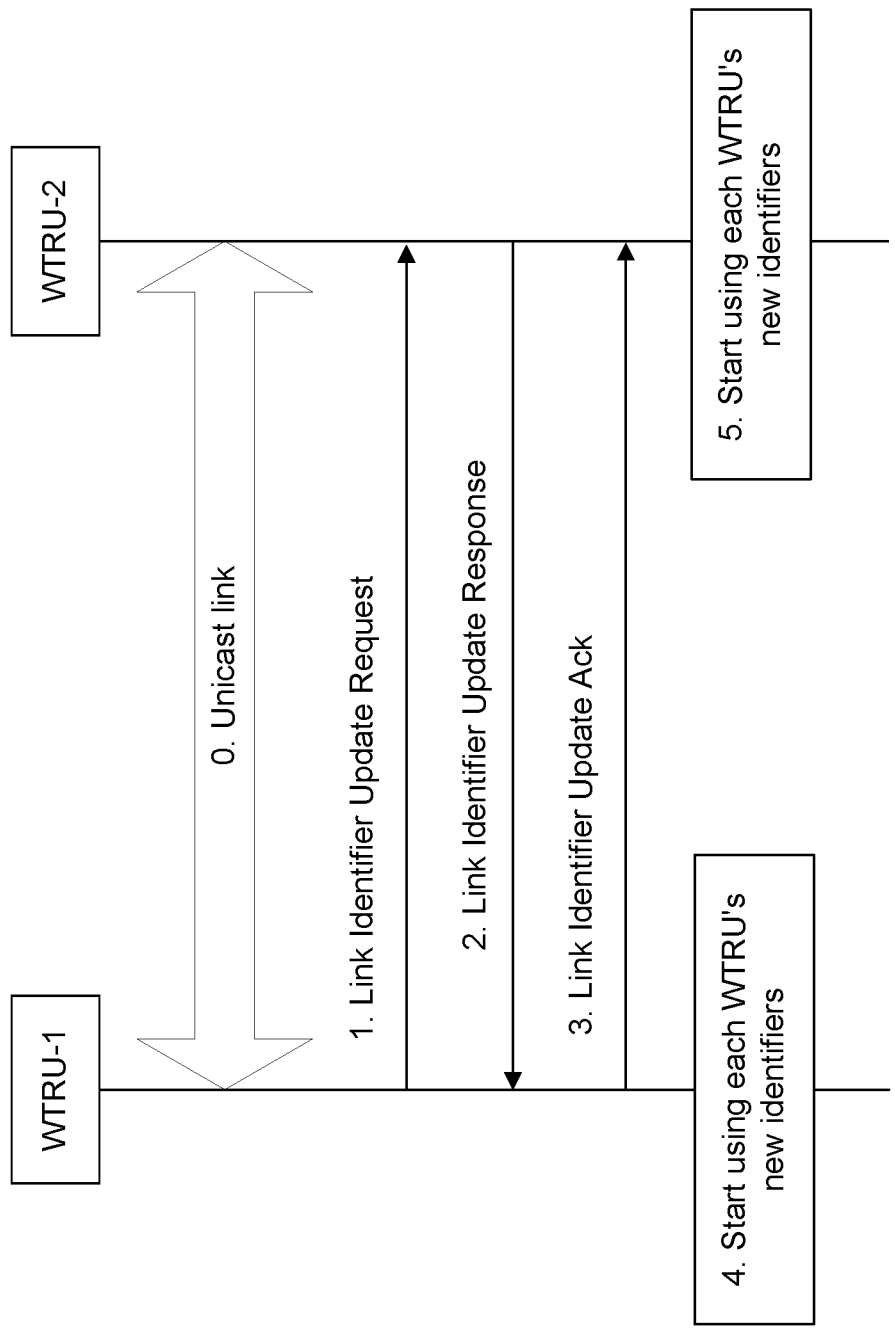
FIG. 3 is a diagram illustrating an example of performing link identifier updates over a unicast link between two WTRUs.

FIG. 3 illustrates example operations associated with performing link identifier updates over a unicast link between two WTRUs. As shown, a first WTRU (e.g., WTRU-1) may transmit an identifier update request to a peer WTRU (e.g., WTRU-2). The request may specify an identifier (e.g., a new L2 ID) of the first WTRU. The identifier (e.g., the new L2 ID) may be sent, for example, as a message payload (e.g., with security protection). The peer WTRU may respond with an identifier update response message, which may specify an identifier (e.g., a new L2 ID) for the peer WTRU. The initiating WTRU (e.g., WTRU-1) may acknowledge reception of the peer WTRU's identifier (e.g., the new L2 ID of the peer WTRU), for example, by sending an identifier update ACK message. The first and second WTRUs may begin using the identifiers (e.g., the new L2 IDs of the initiating WTRU and peer WTRU) following acknowledgement.

Link identifier update operations may be performed via a WTRU-to-WTRU relay, for example, over a PC5 unicast link between a source WTRU (referred to herein as an S-WTRU) and a relay WTRU (referred to herein as an R-WTRU). The identifiers that may be updated may include, for example, an L2 ID, an IP address, an IP prefix, etc. An identifier change such as an IP address change may disrupt end-to-end (E-to-E) communication, e.g., since an S-WTRU and a target WTRU (referred to herein as a T-WTRU) may be communicating using the IP address. For example, a PC5 direct unicast link may not have been established between the S-WTRU and the T-WTRU communicating over IP. Thus, PC5 messages (e.g., link ID update messages) may not be exchanged between the S-WTRU and the T-WTRU. Examples are provided herein describing how the T-WTRU may be informed about an identifier change (e.g., an IP address change) for the S-WTRU. IP addresses may be used herein as examples to illustrate how identifier updates may be performed among peer WTRUs. It should be noted, however, that the same or similar techniques may be used to update other types of identifiers.

An S-WTRU may use the same IP address and/or PC5 unicast link (e.g., via a relay or R-WTRU) to communicate with multiple T-WTRUs. The multiple T-WTRUs may (e.g., each) send a DNS query request (e.g., to the R-WTRU) looking for the S-WTRU (e.g., querying the S-WTRU's IP address by specifying user information associated with the S-WTRU to the R-WTRU and obtaining the S-WTRU's IP address from the R-WTRU). Packets (e.g., IP packets) received at the R-WTRU from different T-WTRUs may be forwarded to the S-WTRU, e.g., via the same PC5 unicast link between the S-WTRU and the R-WTRU The multiple T-WTRUs associated with the S-WTRU and/or the R-WTRU may be informed of an identifier change (e.g., a new IP address) for the S-WTRU, for example, to maintain uninterrupted communications with the S-WTRU.

A privacy setting (e.g., a privacy requirement) associated with WTRU link identifiers may provide that the WTRUs involved in a link (e.g., a PC5 unicast link) change their identifiers at the same time (e.g., simultaneously). For example, the identifiers of an S-WTRU and an R-WTRU may be changed at the same time by executing a link identifier update procedure between the S-WTRU and the R-WTRU. For IP-based communication, the S-WTRU, the R-WTRU, and/or one or more T-WTRU(s) associated with the S-WTRU and/or the R-WTRU may need to change their IP addresses (e.g., at the same time) to preserve security and privacy. The IP address change for the one or more T-WTRUs may be performed via link identifier update operations executed over respective PC5 unicast links between the one or more T-WTRU(s) and the R-WTRU.

S-WTRU to T-WTRU communication may occur over multiple (e.g., two) PC5 unicast links (e.g., a first link between the S-WTRU and an R-WTRU and a second link between the R-WTRU and the T-WTRU). There may not be privacy issues if IP packets exchanged between the S-WTRU and the R-WTRU are encrypted (e.g., since IP addresses within the IP packets may not be accessible or visible to others). IP addresses within unencrypted IP packets (e.g., with only integrity protection), however, may be visible to others, and this may lead to privacy issues. Changing an IP address (e.g., and/or other identifiers) on the S-WTRU and the R-WTRU, but not on a T-WTRU, may cause privacy issues (e.g., if only integrity protection is provided and no encryption is used). Examples are provided herein describing how to trigger a change to an IP address (and other identifiers) on one or more T-WTRUs, e.g., at the same time.

An S-WTRU that obtains an IP address from an R-WTRU may not want its IP address to be shared with every requesting T-WTRU. The S-WTRU may prefer to divulge its IP address only to selected T-WTRUs. Examples are provided herein describing how to inform an R-WTRU about whether a T-WTRU is or may be authorized to obtain an S-WTRU's IP address.

As used herein, a source WTRU (S-WTRU) and a target WTRU (T-WTRU) may correspond to peer WTRUs. An S-WTRU may be referred to interchangeably, for example, as an initiating WTRU, a source WTRU, or a peer WTRU. A T-WTRU may be referred to interchangeably, for example, as a responding WTRU, a target WTRU, or a peer WTRU. A WTRU-to-WTRU relay may be a WTRU that is configured to behave or operate as a relay between two peer WTRUs (e.g., an S-WTRU and a T-WTRU). A WTRU-to-WTRU relay may be referred to interchangeably as a relay WTRU and an R-WTRU.

A relay WTRU (e.g., an R-WTRU) may allocate (e.g., assign or change) an IP identifier (e.g., an IP address or an IP prefix) to other WTRUs (e.g., S-WTRUs and T-WTRUs). For example, the R-WTRU may identify and/or allocate an IP address or IP prefix to an S-WTRU and/or a T-WTRU via a link identifier update response message. The R-WTRU may respond to queries about the IP address/prefix (e.g., a new IP address/prefix) of a peer WTRU communicating via the R-WTRU. The R-WTRU may not be aware of which one or more T-WTRUs are communicating with an S-WTRU or which one or more T-WTRUs should be informed about an IP identifier change (e.g., a new IP address allocation) for an S-WTRU. The R-WTRU may be provided with information for identifying these T-WTRUs.

To preserve privacy and/or security, IP identifiers such as the IP address of a WTRU may be updated. The updates may include one or more of the following: an S-WTRU and an R-WTRU may change their identifiers (e.g., including IP address) and a T-WTRU may be informed of the S-WTRU's new IP identifier; an S-WTRU, an R-WTRU, and one or more T-WTRUs may change their identifiers (e.g., including IP addresses) at the same time (substantially the same time); an R-WTRU may trigger a change of identifiers, e.g., using the identifier update techniques described herein; a PC5 unicast link may be established between an S-WTRU and a T-WTRU over the user plane (e.g., over PC5 links associated with an R-WTRU) to allow the S-WTRU and T-WTRU to exchange their IP addresses and/or other identifiers; etc.

An R-WTRU may obtain or be provided with authorization (e.g., by an S-WTRU) before sharing the IP identifier (e.g., IP address) of a WTRU with other WTRUs (e.g., via DNS queries and/or responses). The R-WTRU may use a token for IP address sharing validation. For example, a token may be provisioned/configured on the R-WTRU or may be obtained from an S-WTRU (e.g., at the time of the S-WTRU registers with the R-WTRU or when a DNS request is received by the R-WTRU from the S-WTRU). The R-WTRU may receive a token from a T-WTRU, for example, in a DNS request and may use to the token to validate whether the IP address of the S-WTRU may be shared with the T-WTRU. The token described herein may be authenticated or unauthenticated, e.g., for one-time use or multiple uses (e.g., the token may be re-used). The token may represent a particular authentication policy (e.g., to be enforced at the R-WTRU) and may be provisioned to an S-WTRU and/or a T-WTRU (e.g., by a ProSe application).

An authorization policy such as one indicating that no authorization is required for an S-WTRU may be distributed to an R-WTRU (e.g., by a ProSe application or other ProSe policy repository). Such a policy may allow the R-WTRU to act as a policy enforcement point (PEP) to grant or deny DNS queries from a particular WTRU or a group of WTRUs without a special authorization mechanism (e.g., such as a token). An R-WTRU may (e.g., without receiving an authorization policy from a ProSe application) authorize the sharing of an S-WTRU's IP address. The R-WTRU may do so, for example, by validating a first token received in a DNS request (e.g., from a T-WTRU) against a second token received from the S-WTRU. The R-WTRU may also query the S-WTRU about a token received from a T-WTRU (e.g., when the R-WTRU has not been provided with a token by the S-WTRU that the R-WTRU may use to validate the token from the T-WTRU).

An S-WTRU may desire to change its IP address (e.g., and/or other identifiers), for example, for privacy and/or security reasons. A T-WTRU, with which the S-WTRU may be communicating over a PC5 unicast link (e.g., through an R-WTRU), may be informed of the S-WTRU's new IP address in order to continue IP-based communication with the S-WTRU. The S-WTRU may be communicating with more than one T-WTRU over the PC5 unicast link. In this case, the more than one T-WTRUs may be informed of the S-WTRU's new IP address, for example, at the same time (e.g., during a same procedure execution, using a same set of messages, etc.).

An S-WTRU that desires to change its IP address (or other identifiers) may determine whether one or more T-WTRUs that the S-WTRU is communicating with should also change their IP addresses (and/or other identifiers), for example, at substantially the same time the IP address (and/or other identifiers) is changed for the S-WTRU. Information relating to these changes (e.g., whether the one or more T-WTRUs should also change their IP addresses) may be provided to the S-WTRU by an application layer (or a network) and/or may be provisioned on the S-WTRU per application ID (e.g., at an application level). The S-WTRU may indicate to an R-WTRU whether the one or more T-WTRUs should also change their IP addresses (and/or other identifiers). For example, the S-WTRU may include an indication (e.g., a peer update indication) in a link identifier update request message to the R-WTRU and may set the indication to inform the R-WTRU that the target WTRU identifiers should be updated and that the target WTRUs should be informed of the S-WTRU's new IP address. The S-WTRU may also set the indication to inform the R-WTRU that the target WTRU identifiers should not be updated and that the target WTRUs should be informed of the S-WTRU's new IP address. The S-WTRU may also set the indication to inform the R-WTRU that the target WTRU identifiers should not be updated and that the target WTRUs should not be informed of the S-WTRU's new IP address.

Example R-WTRU behaviors responsive to receiving the peer update indication described herein are provided below. In examples, a peer update indication from the S-WTRU may be set to indicate that peer WTRU ID(s) should be updated and that the peer WTRU(s) should be informed of the S-WTRU's new IP address. In response, the R-WTRU may change the identifiers of one or more (e.g., all) WTRUs (e.g., the S-WTRU and/or one or more T-WTRUs) involved in sidelink (e.g., PC5) communications with the S-WTRU and/or the R-WTRU. In examples, a peer update indication from the S-WTRU may be set to indicate that peer WTRU ID(s) should not be updated and that the peer WTRU(s) should be informed of the S-WTRU's new IP address. In response, the R-WTRU may change the identifier(s) of the S-WTRU and/or the R-WTRU, and may inform one or more T-WTRUs about the S-WTRU's new IP address. In these examples, the identifiers of fewer than all WTRUs involved in the WTRU-to-WTRU relay communication may be changed. In examples, a peer update indication from the S-WTRU may be set to indicate that peer WTRU ID(s) should not be updated and that the peer WTRU(s) should not be informed of the S-WTRU's new IP address. In response, the R-WTRU may complete the identifier update operation with the S-WTRU, and may not inform T-WTRUs about the S-WTRU's new IP address. In these examples, the S-WTRU may inform a T-WTRU about the S-WTRU's new IP address, for example, via an end-to-end PC5 unicast link established between the S-WTRU and the T-WTRU.

Operations may be carried out by one or more WTRUs to change the identifier (e.g., IP address) of an S-WTRU and/or an R-WTRU, and to inform a T-WTRU of the S-WTRU's new identifier (e.g., IP address). These operations may be carried out, for example, based on a peer update indication (as described herein) from the S-WTRU that indicates that peer WTRU ID(s) should not be updated and that the peer WTRU(s) should be informed of the S-WTRU's new identifier (e.g., IP address). For instance, the S-WTRU may be informed (e.g., via an application layer, based on the expiration of a timer, etc.) that its IP address (e.g., and/or other identifiers such as IP prefix, application ID, L2 ID, etc.) is to be changed in accordance with a policy or rule to maintain privacy/security. The S-WTRU may trigger the identifier update procedure over a PC5 link established between the S-WTRU and an R-WTRU (e.g., the PC5 link may be associated with the IP address to be changed). The S-WTRU may make a request (e.g., as part of a PC5 link identifier update procedure) to the R-WTRU to obtain a new IP address/prefix (or other identifiers), for example, if the R-WTRU is configured to allocate the IP address/prefix (or other identifiers) for the S-WTRU.

Figure 4:
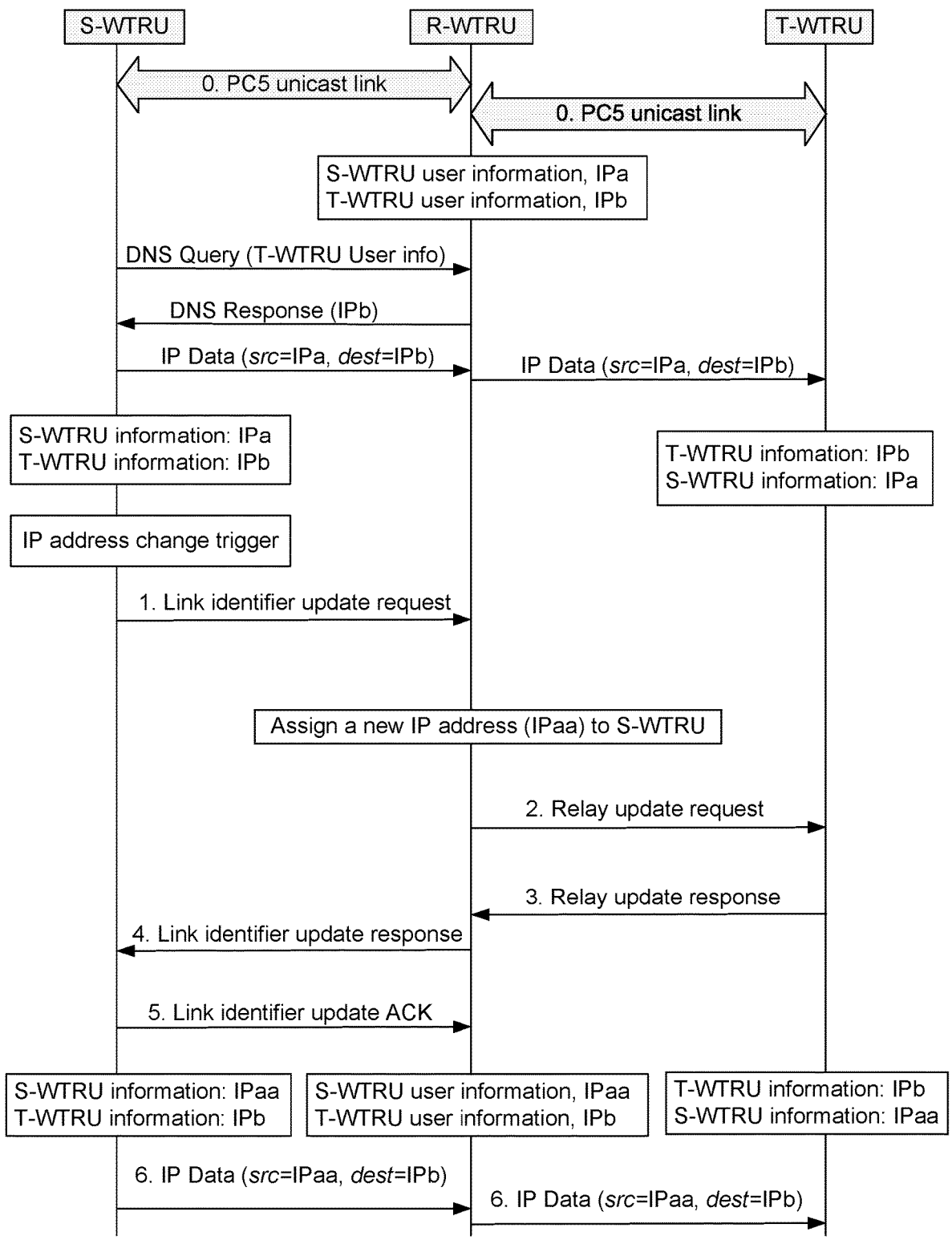
FIG. 4 is a diagram illustrating example operations associated with changing the IP address of a source WTRU (S-WTRU).

FIG. 4 illustrates example operations associated with changing an identifier (e.g., an IP Address) of an S-WTRU or an R-WTRU. At 0, a first sidelink (e.g., PC5 unicast link) may be established between an S-WTRU and an R-WTRU and a second sidelink (e.g., PC5 unicast link) may be established between the R-WTRU and a T-WTRU (e.g., respective PC5 links may be established between the R-WTRU and one or more T-WTRUs). The R-WTRU may be a relay WTRU associated with the S-WTRU and the T-WTRU (e.g., one or more T-WTRUs). The S-WTRU may discover the T-WTRU, for example, by sending a query request (e.g., a DNS query request) to the R-WTRU. The R-WTRU may respond (e.g., via a DNS response) to the query request and indicate (e.g., includes) an identifier of the T-WTRU (e.g., the T-WTRU's IP address) in the response. Query authorization (e.g., DNS query authorization) may be utilized for the R-WTRU to determine whether to disclose the T-WTRU's identifier (e.g., IP address) to the S-WTRU (e.g., whether to answer the DNS query from the S-WTRU). The R-WTRU may do so, for example, in cases where the T-WTRU's IP address is to be protected for privacy or security reasons. The roles of the S-WTRU and the T-WTRU as shown in FIG. 4 may be reversed (e.g., the T-WTRU may discover the S-WTRU, etc.). Additional details about the query authorization are provided below.

The S-WTRU and T-WTRU shown in FIG. 4 may exchange IP data, for example, via the R-WTRU (e.g., over the respective PC5 links with the S-WTRU and T-WTRU, as described herein). The S-WTRU may (e.g., during link establishment) send an indication to the R-WTRU indicating that a link between the S-WTRU and the R-WTRU requires privacy. The R-WTRU may decide to accept or reject a direct communication request (e.g., from a S-WTRU) based on this indication. The R-WTRU may perform similar actions for one or more T-WTRUs. For example, the R-WTRU may decide not to accept a request from a T-WTRU that requires privacy protection (e.g., because of resource limitations). The R-WTRU may include an indication of privacy support when it establishes a PC5 unicast link with an S-WTRU or T-WTRU.

Still referring to FIG. 4, at 1, the S-WTRU may trigger one or more link identifier update operations (e.g., as part of a link identifier update procedure), for example, based on an identifier update trigger (e.g., the trigger may be pre-configured). The S-WTRU may generate (e.g., auto-generate) a new L2 ID and may send a link identifier update request message to the R-WTRU. The message may include, for example, one or more of the following: the S-WTRU's new L2 ID, an indication that a new IP address for the S-WTRU is desired, T-WTRU information (e.g., a list of T-WTRU IP addresses, T-WTRU user information, etc.), a peer update indication (e.g., as described herein), and/or other identifiers (e.g., an application ID, an application layer ID of the S-WTRU, etc.) that have been or will be updated. The S-WTRU may set its current IP address to deprecated (e.g., S-WTRU may continue to use this IP address but should not start a new communication with it).

In response to receiving the request message from the S-WTRU, the R-WTRU may assign a new IP address to the S-WTRU and/or may save the S-WTRU's new IP address (e.g., locally). The R-WTRU may assign (e.g., self-assign) a new L2 ID and/or a new IP address to itself and may use such L2 ID and/or IP address to communicate with the S-WTRU over the PC5 link with the S-WTRU. The R-WTRU may fetch T-WTRU information (e.g., T-WTRU records or entries) based on the T-WTRU information (e.g., T-WTRU user information and/or IP address(es)) provided by the S-WTRU. Such T-WTRU information may be stored, for example, locally by the R-WTRU (e.g., in a local table or database maintained by the R-WTRU).

The R-WTRU may verify the peer update indication provided by the S-WTRU. In examples, (e.g., if the peer update indication indicates that peer WTRU ID(s) should not be updated), the R-WTRU may, at 2, send a message such as a PC5 relay update request message to the T-WTRU to inform the T-WTRU about the S-WTRU's new identifier(s) (e.g., new IP address). The R-WTRU may include one or more of following in the message: the old IP address of the S-WTRU, user information associated with the S-WTRU, the new IP address of the S-WTRU, and/or other identifiers associated with the S-WTRU (e.g., an application layer ID or application ID associated with the S-WTRU, if previously received by the R-WTRU). The R-WTRU may carry out other operations if the peer update indication indicates that peer WTRU ID(s) should be updated. These operations will be described in greater detail below with reference to FIG. 5.

The T-WTRU may receive the PC5 message from the R-WTRU, fetch (e.g., locate) information (e.g., a stored record or entry) about the S-WTRU (e.g., based on the user information and/or old IP address of the S-WTRU), and/or save the S-WTRU's new IP address (e.g., in addition to the S-WTRU's old IP address). The T-WTRU may be able to continue to receive IP data such as packets sent before the S-WTRU receives its new IP address using the S-WTRU's old IP address. The T-WTRU may do so, for example, until the T-WTRU receives an IP packet that includes the S-WTRU's new IP address. At that point, the T-WTRU may start using the S-WTRU's new IP address (e.g., the T-WTRU may release or delete the S-WTRU's old IP address). AT 3, the T-WTRU may send a PC5 relay update response message to the R-WTRU and may include parameters such as the S-WTRU's user information, the S-WTRU's old and/or new IP address, etc. in the response message (e.g., to acknowledge the reception of those parameters).

At 4, the R-WTRU may send a link identifier update response message to the S-WTRU. The response message may include, for example, one or more of the following: the S-WTRU's new IP address, the R-WTRU's new L2 ID, the R-WTRU's new IP address, and/or other identifiers that the R-WTRU may have received from the T-WTRU(s).

The R-WTRU may start a timer, for example, when (e.g., upon) sending the PC5 relay update request message to the T-WTRU at 2. The R-WTRU may use this timer to avoid waiting indefinitely for a response from the T-WTRU before replying to the S-WTRU's request. If the timer expires (e.g., before the T-WTRU responds), the R-WTRU may reply to the S-WTRU and may provide the S-WTRU with the new IP address assigned to the S-WTRU. The R-WTRU may provide a status code (e.g., in the link identifier update response message sent to the S-WTRU) indicating whether the T-WTRU has been successfully informed about the S-WTRU's IP address change (e.g., the status code may indicate success or failure).

The R-WTRU may (e.g., if more than one T-WTRU was specified by the S-WTRU in the query request at 1) wait for responses from the T-WTRU(s) or for the expiration of the timer before replying to the S-WTRU. The R-WTRU may (e.g., if at least one T-WTRU has not responded before the timer expires) provide a list of T-WTRUs (e.g., including the T-WTRUs' user information and/or IP addresses) to the S-WTRU. This list may indicate to the S-WTRU which T-WTRU(s) have or have not been successfully updated about the S-WTRU's new IP address. The R-WTRU may set the status code described herein to failure for the T-WTRU(s) that have not been successfully updated with S-WTRU's new IP address.

The S-WTRU may save its new identifier(s) (e.g., L2 ID, IP address, etc.) and/or the R-WTRU's new identifier(s) (e.g., L2 ID, IP address, etc.). At 5, the S-WTRU may send an acknowledgment (ACK) message (e.g., a link identifier update ACK message) to the R-WTRU and may include the new identifier(s) (e.g., new IP address) received in the identifier update response message in the ACK message. At 6, the S-WTRU and the R-WTRU may start using their new identifier(s) (e.g., L2 IDs) for sidelink (e.g., PC5) communications. The S-WTRU may start using its new IP address (or IP prefix) to exchange IP data with the T-WTRU(s) (e.g., the T-WTRU that have been successfully informed about the S-WTRU's new IP address).

The addition of an indication for a new IP address in a link identifier update request message and/or the addition of a newly allocated IP address in a link identifier update response message may be applicable to direct sidelink (e.g., PC5) communications such as when the S-WTRU and the T-WTRU directly communicate with each other via a PC5 link without involving the R-WTRU (e.g., the T-WTRU may allocate an IP address for the S-WTRU, in which case the T-WTRU may act as a DHCP server for the S-WTRU). In those situations, the S-WTRU may obtain a new identifier (e.g., a new IP address, IP prefix, etc.) from the T-WTRU via one or more link identifier update operations (e.g., as part of a link identifier update procedure). In examples, the S-WTRU may act as a DHCP server (e.g., for one or more T-WTRUs) and may initiate one or more link identifier update operations (e.g., as part of a link identifier update procedure) for one or more T-WTRUs. In those examples, the S-WTRU may allocate a new IP address to one or more of the T-WTRUs and may specify the new IP address(es) in a link identifier update request message.

In the example illustrated by FIG. 4, the R-WTRU may send the new IP address to the S-WTRU before updating the T-WTRU(s) about the S-WTRU's IP address. For example, the R-WTRU may wait for reception of the ACK message from the S-WTRU (e.g., sent at 5) before updating the T-WTRU(s) about the S-WTRU's IP address. The S-WTRU may start an IP change timer (e.g., upon sending the identifier update request to the R-WTRU or upon receiving the identifier update response from the R-WTRU), and may continue to use its old IP address until it receives an IP packet from the T-WTRU(s) using the new IP address or until the IP change timer expires (e.g., whichever occurs earlier). The S-WTRU may (e.g., if the S-WTRU is associated with more than one T-WTRU) start using its new IP address with those T-WTRUs that have started using the S-WTRU's new IP address and may keep using its old IP address with those T-WTRUs that have not yet started using the S-WTRU's new IP address. The S-WTRU may start an IP change timer as described herein per T-WTRU (e.g., one such timer may be created for each T-WTRU).

In the example illustrated by FIG. 4, the messages exchanged between the WTRUs may be messages associated with existing functionality of the WTRUs (e.g., the messages may be associated with an existing PC5 link identifier update procedure) or they may be new messages (e.g., new PC5 messages) introduced to allow the S-WTRU to request a new IP address from the R-WTRU (or the T-WTRU) without triggering a change of other identifiers (e.g., L2 ID, security identifiers, etc.). For example, the S-WTRU, R-WTRU, and/or T-WTRU may exchange PC5 messages (e.g., link IP address update request/response messages) with link IP address request parameters and/or link IP address response parameters. Such link IP address request parameters may include, for example, a list of T-WTRU user information and/or related IP address(es) (e.g., if the T-WTRU is to be informed about the S-WTRU's IP address). The link IP address response parameters may include, for example, one or more of the following: a new IP address/IP prefix of the S-WTRU, a status code (e.g., success/failure in informing the T-WTRU about the IP address change), and/or user information and/or IP address(es) of the T-WTRUs that have not been updated successfully with the S-WTRU's new IP address.

In the example illustrated by FIG. 4, the S-WTRU may obtain a new IP address from another entity (e.g., other than the R-WTRU) and the S-WTRU may specify this new IP address on the link identifier update request message sent at 1 (e.g., instead of indicating that a new IP address is to be assigned to the S-WTRU). In these cases, the R-WTRU may keep track of (e.g., save) the new IP address of the S-WTRU.

The identifiers (e.g., IP addresses) of multiple (e.g., all) WTRUs involved in sidelink (e.g., PC5) communications such as an S-WTRU, an R-WTRU, and one or more T-WTRUs may be changed. For example, if an S-WTRU indicates, e.g., in a peer update message, that peer WTRU identifier(s) should be updated and peer WTRU(s) should be informed of the S-WTRU's new identifier (e.g., IP address), the identifiers (e.g., IP addresses) of those peer WTRUs may also be changed. The peer WTRUs (e.g., the S-WTRU, the R-WTRU, and/or the one or more T-WTRUs that are aware of the S-WTRU's old IP address) may update their identifiers such as IP address and/or other identifiers for privacy reasons. Link identifier updates may be performed between the S-WTRU and R-WTRU, and/or between the R-WTRU and the one or more T-WTRUs.

Figure 5:
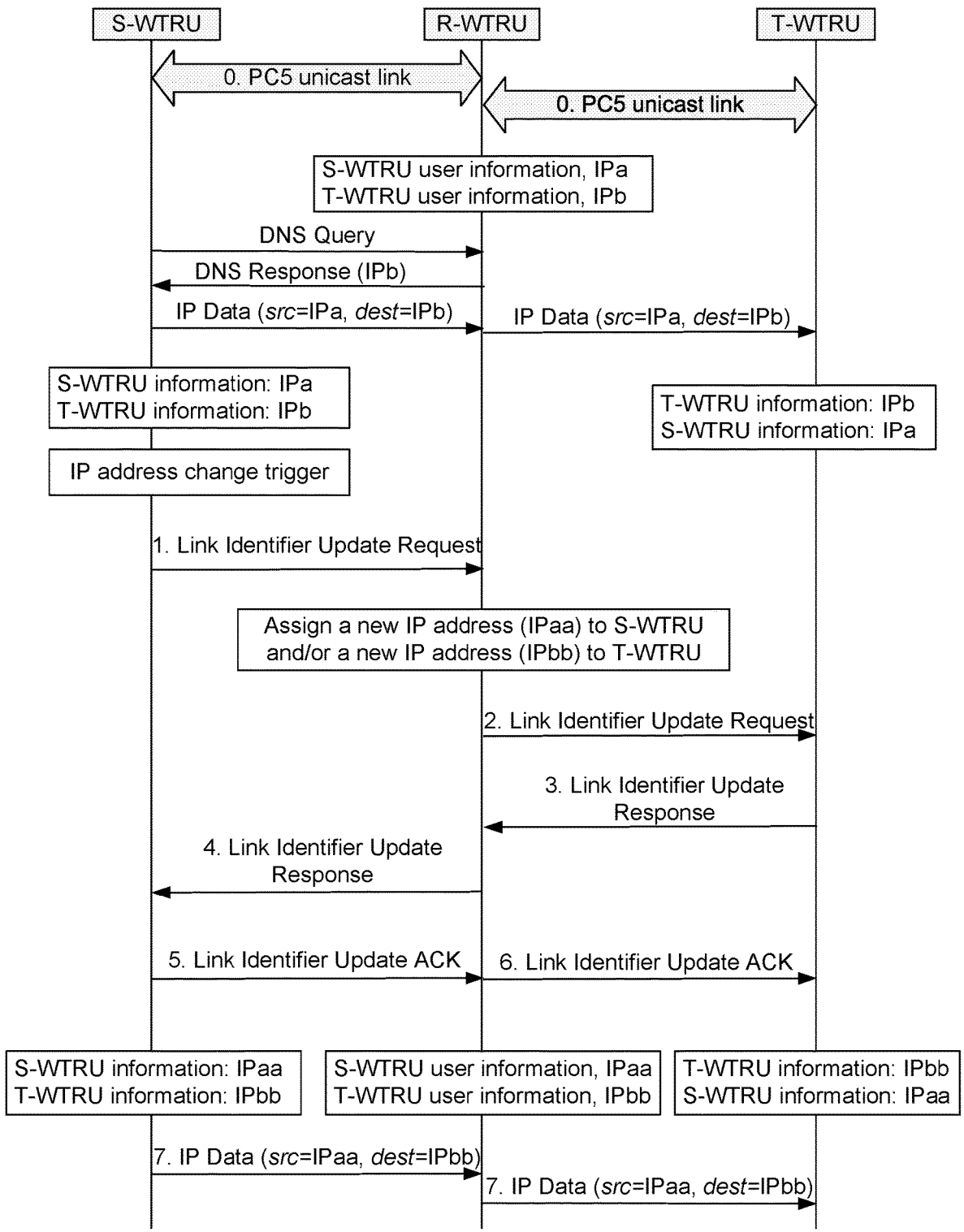
FIG. 5 is a diagram illustrating example operations associated with changing the IP addresses of an S-WTRU, a relay WTRU (R-WTRU), and/or one or more target WTRUs (T-WTRU(s)).

FIG. 5 illustrates example operations associated with changing the IP address(es) of an S-WTRU, an R-WTRU, and one or more T-WTRUs. While the examples are described in the context of IP address change, they may also be applicable to updating other types of identifiers (e.g., IP prefixes, L2 IDs, etc.). As shown, at 0, a first sidelink (e.g., PC5 unicast link) may be established between an S-WTRU and an R-WTRU, and a second sidelink (e.g., PC5 unicast link) may be established between the R-WTRU and a T-WTRU (e.g., respective PC5 links may be established between the R-WTRU and one or more T-WTRUs). The R-WTRU may be a relay WTRU associated with the S-WTRU and the T-WTRU (e.g., one or more T-WTRUs). The S-WTRU may discover the T-WTRU, for example, by sending a query request (e.g., a DNS query request including the T-WTRU's user information) to the R-WTRU, and the R-WTRU may send a response (e.g., a DNS response) to the R-WTRU that indicates (e.g., includes) the T-WTRU's IP address. IP data may be exchanged between the S-WTRU and the T-WTRU, for example, via the R-WTRU (e.g., over the PC5 links as described herein).

At 1, the S-WTRU may be informed (e.g., via an application layer, based on the expiration of a timer, etc.) that its IP address and/or other identifiers (e.g., application layer ID, L2 ID, etc.) are to be changed. In response, the S-WTRU may trigger one or more link identifier update operations (e.g., as part of a link identifier update procedure). For example, the S-WTRU may generate (e.g., auto-generate) a new L2 ID and may send a link identifier update request message to the R-WTRU. The message may include, for example, one or more of the following: the S-WTRU's new L2 ID, an indication that a new IP address is to be allocated or assigned to the S-WTRU, T-WTRU information (e.g., a list of T-WTRU IP address(es), T-WTRU user information, etc.), and/or a peer update indication (e.g., as described herein).

In response to receiving the link identifier update request from the S-WTRU, the R-WTRU may assign or allocate a new IP address to the S-WTRU and may save the IP address (e.g., locally), for example, while still preserving the S-WTRU's current IP address. The R-WTRU may assign (e.g., self-assign) a new L2 ID and/or new IP address for the R-WTRU to communicate with the S-WTRU via the PC5 link with the S-WTRU. The R-WTRU may fetch information about the T-WTRU (e.g., from a T-WTRU record or entry stored by the R-WTRU, e.g., in a local table). The R-WTRU may check the peer update indication provided by the S-WTRU and determine whether the indication indicates that peer WTRU ID(s) should be updated. The R-WTRU may (e.g., if the indication is to update peer WTRU ID(s)) assign a new IP address to the T-WTRU, and/or assign (e.g., self-assign) a new L2 ID and/or a new IP address for the R-WTRU to communicate with the T-WTRU via the PC5 link with the T-WTRU. The R-WTRU may repeat these operations for multiple (e.g., all) WTRUs (e.g., as specified by the S-WTRU in the update request message) and the PC5 links associated with those T-WTRUs.

At 2, the R-WTRU may send a link identifier update request message to the one or more T-WTRUs specified by the S-WTRU. Such a message may include, for example, one or more of the following: the R-WTRU's new L2 ID, the R-WTRU's new IP address, the T-WTRU's new IP address, the S-WTRU's old IP address, the S-WTRU's user information, and/or the S-WTRU's new IP address.

The T-WTRU may save the new IP address(es) provided by the R-WTRU and/or may generate (e.g., auto-generate) a new L2 ID for the T-WTRU itself. The T-WTRU may fetch information about the S-WTRU (e.g., from a S-WTRU record or entry stored by the T-WTRU) based on the S-WTRU's old IP address and/or the S-WTRU's user information. The T-WTRU may save the S-WTRU's new IP address and/or other information provided by the R-WTRU relating to the PC5 links between the S-WTRU and the T-WTRU (e.g., new L2 ID(s), IP address(es), etc.). At 3, the T-WTRU may reply to the R-WTRU by sending a link identifier update response message. Such a message may include the T-WTRU's new L2ID and/or the parameters received by the T-WTRU via the update request message sent by the R-WTRU at 2 (e.g., to acknowledge the reception of these parameters).

The R-WTRU may receive the response message (e.g., the link identifier update response message) from the T-WTRU (or multiple T-WTRUs). The R-WTRU may save the new L2 ID indicated by the T-WTRU, and send a link identifier update response message to the S-WTRU at 4. Such a message may include one or more of the following: the S-WTRU's new IP address, the T-WTRU's user information, the T-WTRU's old IP address, the T-WTRU's new IP address, the R-WTRU's new L2 ID, and/or the R-WTRU's new IP address.

The R-WTRU may (e.g., if more than one T-WTRU was specified by the S-WTRU at step 1), wait for reception of link identifier update response messages from one or more (e.g., all) T-WTRU(s) specified by the S-WTRU before sending the link identifier update response message to the S-WTRU. The waiting for these T-WTRUs may be limited (e.g., controlled) by a timer, the expiration of which may indicate that a maximum waiting period for the T-WTRUs to respond has passed. The R-WTRU may start the timer, for example, when (e.g., upon) sending link identifier update request messages to the T-WTRUs. The R-WTRU may, at the expiration of the timer, send the link identifier update response message described herein to the S-WTRU.

The S-WTRU may save its new IP address, the T-WTRU's new IP address, and/or the R-WTRU's new L2

ID and/or IP address. At 5, the S-WTRU may send a link identifier update ACK message to the R-WTRU. The ACK message may include, for example, the parameters received in the response message sent by the R-WTRU at 4 (e.g., to acknowledge the reception of those parameters).

At 6, the R-WTRU may send a link identifier update ACK message to the one or more T-WTRUs. The ACK message may include, for example, the parameters received in the response message sent by the T-WTRUs at 3. At 7, the S-WTRU, the R-WTRU, and/or the one or more T-WTRUs may start using their new IP addresses for IP data exchange. The old IP addresses of the WTRUs may be released or deleted, for example, once data has been received (e.g., by one or more of the WTRUs) using the new IP address(es).

In the example illustrated in FIG. 5, the S-WTRU may obtain a new IP address from another entity (e.g., other than the R-WTRU) and may specify this new IP address on the link identifier update request message sent at 1 (e.g., instead of indicating that a new IP address is to be assigned for the S-WTRU). In these cases, the T-WTRU may specify its new IP address (e.g., obtained from another entity) on the link identifier update response message sent at 3 (e.g., no IP address is specified on the link identifier update request message sent by the R-WTRU at 2). The R-WTRU may keep track of (e.g., save) the new IP addresses for the S-WTRU and the T-WTRU (e.g., the R-WTRU does not allocate new IP addresses for the S-WTRU and the T-WTRU).

An R-WTRU may trigger a change in the identifier(s) of other WTRUs including an S-WTRU and a T-WTRU. For example, an R-WTRU may allocate a new identifier (e.g., a new IP address) to an S-WTRU. The R-WTRU may send the new IP address to the S-WTRU, for example, via one or more identifier update operations (e.g., as parts of a link identifier update procedure). In these examples, the R-WTRU may send a link identifier update request message to the S-WTRU (e.g., instead of from the S-WTRU to the R-WTRU). The S-WTRU may reply with a list of T-WTRUs that are to be informed of the S-WTRU's new IP address, and the R-WTRU may inform the list of T-WTRUs about the S-WTRU's new IP address. The R-WTRU may allocate a new identifier (e.g., a new IP address) to a T-WTRU through similar operations (e.g., by reversing the roles of the S-WTRU and the T-WTRU).

The trigger for an R-WTRU to change an IP address (e.g., of an S-WTRU or a T-WTRU) may be linked with triggers to change other identifiers such as an application layer ID. For example, when an application layer ID is being changed, one or more (e.g., all) PC5 interfaces on the R-WTRU that are associated with the application layer ID may also be updated, for example, along with relevant IP address(es) and L2 ID(s). The R-WTRU may initiate link identifier update operations (e.g., as part of a link identifier update procedure) on multiple PC5 links (e.g., at the same time). These PC5 links may include, for example, a link to an S-WTRU and a link to a T-WTRU. The R-WTRU may not know which WTRUs are talking to each other, so the R-WTRU may wait for a list of T-WTRUs to be transmitted to the R-WTRU by an S-WTRU (e.g., included in a link identifier update response message from an S-WTRU). The R-WTRU may (e.g., once the list of T-WTRUs is received) send the new IP addresses of the T-WTRUs in a link identifier update ACK message back to the S-WTRU. Multiple T-WTRUs may be communicating with the S-WTRU, so the R-WTRU may wait for responses from one or more (e.g., all) of the specified T-WTRUs after the R-WTRU triggers the change of IP addresses for these T-WTRU, or the R-WTRU may wait for the expiration of a timer, before the R-WTRU sends the link identifier update ACK message to the S-WTRU (e.g., including the new IP addresses of the multiple T-WTRUs). This may allow the one or more (e.g., all) of the T-WTRUs to begin receiving IP data using their new IP addresses.

Figure 6:
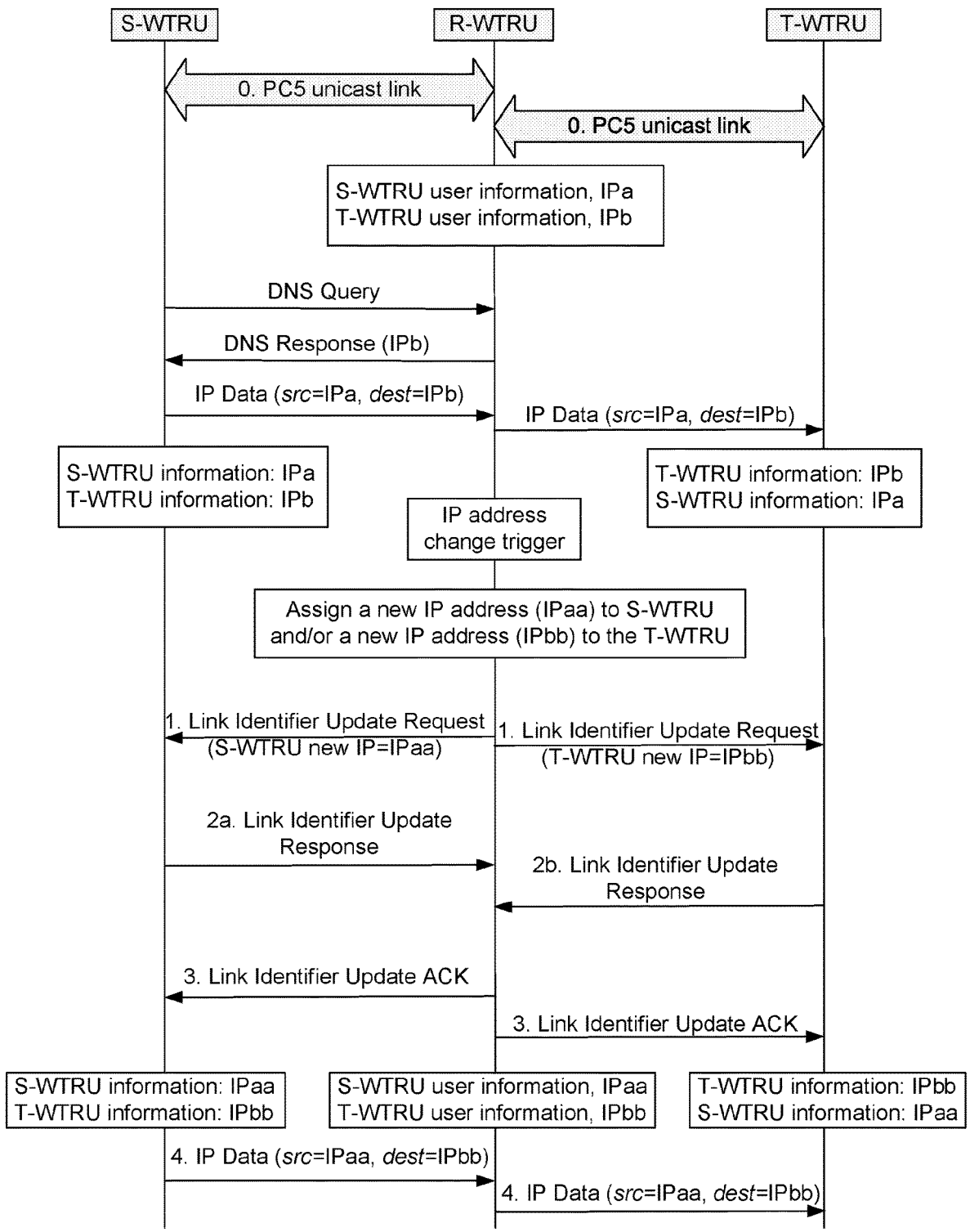
FIG. 6 is a diagram illustrating an example of triggering an IP address change from a relay WTRU.

FIG. 6 illustrates example operations associated with IP address changes triggered by an R-WTRU. At 0, a first sidelink (e.g., PC5 unicast link) may be established between an S-WTRU and an R-WTRU, and a second sidelink (e.g., PC5 unicast link) may be established between the R-WTRU and a T-WTRU (e.g., respective PC5 links may be established between the R-WTRU and one or more T-WTRUs). The S-WTRU may discover the T-WTRU, for example, by sending a DNS query request (e.g., including the T-WTRU's user information) to the R-WTRU. The R-WTRU may send a DNS response, for example, with the T-WTRU's IP address. IP data may then be exchanged between the S-WTRU and the T-WTRU through the R-WTRU and over the PC5 links.

The R-WTRU may be informed (e.g., via an application layer, based on the expiration of a timer, etc.) that its IP address and/or other identifiers (e.g., application layer ID, L2 ID, etc.) are to be changed. In response, the R-WTRU may trigger one or more link identifier update operations (e.g., as part of a link identifier update procedure). For example, the R-WTRU may generate (e.g., auto-generate) a new L2 ID and/or a new IP address for itself, fetch information about one or more peer WTRUs (e.g., the S-WTRU and the T-WTRU), and/or assign new IP addresses to the peer WTRUs. AT 1, the R-WTRU may send a link identifier update request message to the peer WTRUs (e.g., to each of the peer WTRUs). Such a link identifier update request message may include, for example, the new IP address of the R-WTRU and/or the new IP address of the peer WTRU(s).

At 2a, the S-WTRU may save the new IP address assigned by the R-WTRU and/or respond to the R-WTRU, for example, by sending a link identifier update response message. The message may include, for example, the S-WTRU's new IP address, user information associated with one or more T-WTRUs, and/or the IP addresses of the one or more T-WTRUs. At 2b, the T-WTRU may (e.g., similar to the S-WTRU) save the new IP address assigned by the R-WTRU and/or respond to the R-WTRU, for example, by sending a link identifier update response message. The message may include, for example the T-WTRU's new IP address and information about its peer(s) (e.g., the S-WTRU's user information, the S-WTRU's current IP address, etc.).

The R-WTRU may receive the link identifier update response messages from its peer WTRUs (e.g., the S-WTRU and the T-WTRU). At 3, the R-WTRU may send (e.g., synchronized) link identifier update ACK messages to one or more (e.g., each) of the peer WTRUs. The ACK message sent to the S-WTRU may include, for example, user information associated with one or more T-WTRUs, the old IP address(es) of one or more T-WTRUs, and/or the new IP address(es) of one or more T-WTRUs, wherein the one or more T-WTRUs may include those described in association with 2 (e.g., as indicated on the link identifier update response message from S-WTRU). A similar ACK message may be sent to the one or more T-WTRUs. Such an ACK message may include, for example, the old IP address of the S-WTRU, the new IP address of the S-WTRU, user information associated with the S-WTRU, etc.

At 4, the S-WTRU and/or the T-WTRU may start using their new IP address and their peer WTRU's new IP address for IP data exchange. Even though FIG. 6 shows an example of a relay WTRU triggering an identifier change, the relay WTRU (e.g., an R-WTRU) may be configured to not trigger the change and may rely on one or more peer WTRUs to trigger the identifier change (e.g., via a link identifier update procedure).

In the example illustrated in FIG. 6, the S-WTRU and/or the T-WTRU may obtain a new IP address from another entity (e.g., other than the R-WTRU). In those scenarios, the R-WTRU may not specify a new IP address for the S-WTRU or the T-WTRU, and may learn the address(es) from a link identifier update response message sent by the S-WTRU or the T-WTRU.

An end-to-end (E-to-E) sidelink (e.g., PC5 unicast link) may be established between an S-WTRU and a T-WTRU, for example, on top of an IP layer. One or more of the following operations may be performed over such an E-to-E link. These operations may be triggered, for example, by an peer update message in which the S-WTRU may indicate that peer WTRU identifier(s) should not be updated and peer WTRU(s) should not be informed of the S-WTRU's new IP address. The S-WTRU may inform the T-WTRU about the change directly using the E-to-E PC5 unicast link.

Figure 7:
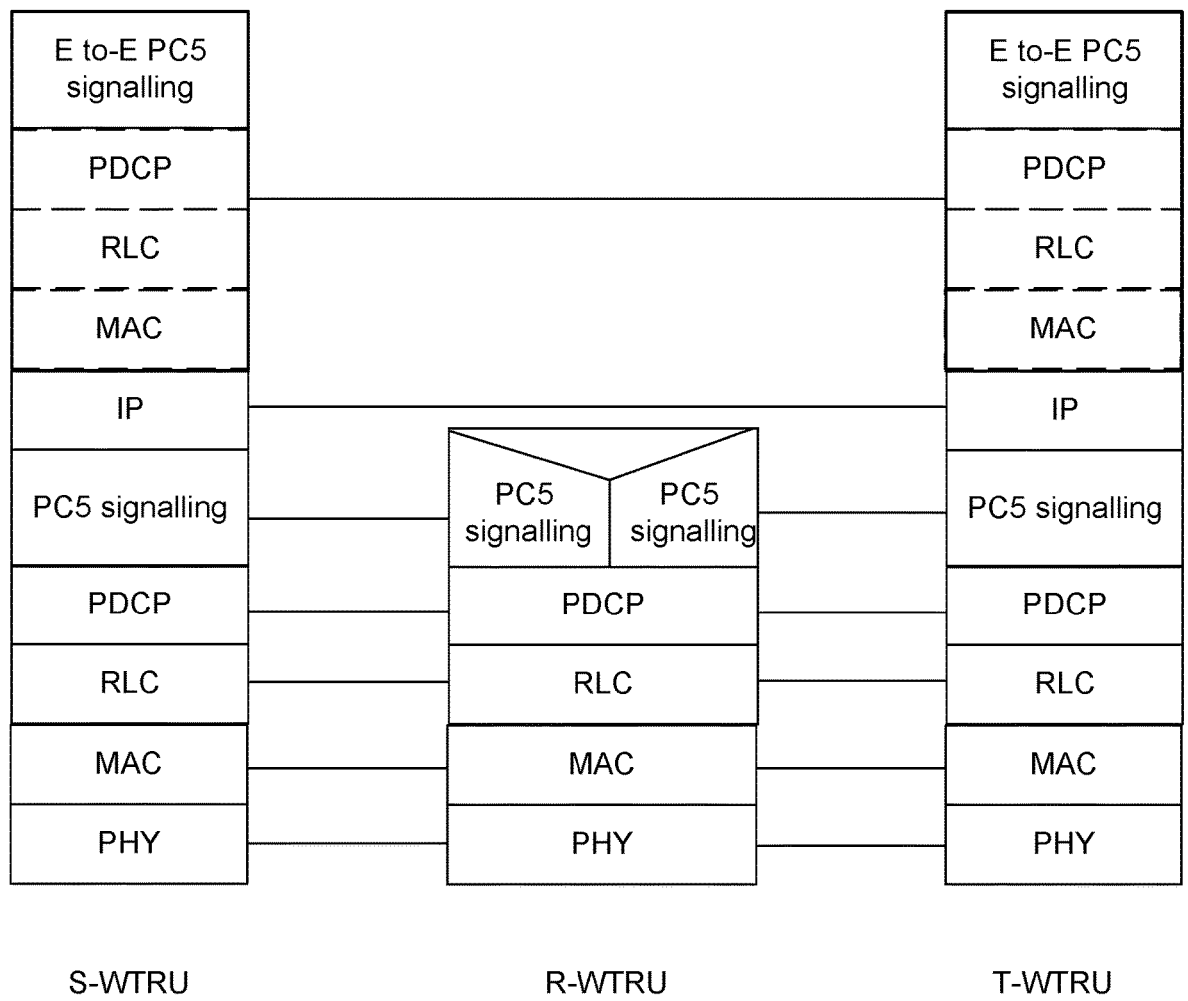
FIG. 7 is a diagram illustrating an example protocol stack for an end-to-end PC5 unicast link.

FIG. 7 shows an example protocol stack for an E-to-E PC5 unicast link. Even though the figure shows a MAC layer, an RLC layer, and a PDCP layer over an IP layer, the stack may or may not include these layers. The stack may include the MAC, RLC and PDCP layers over an IP layer, for example, if there is no security protection on a PC5 unicast link between an S-WTRU/T-WTRU and an R-WTRU, and/or if the R-WTRU associated with the S-WTRU/T-WTRU is not trustworthy.

Figure 8:
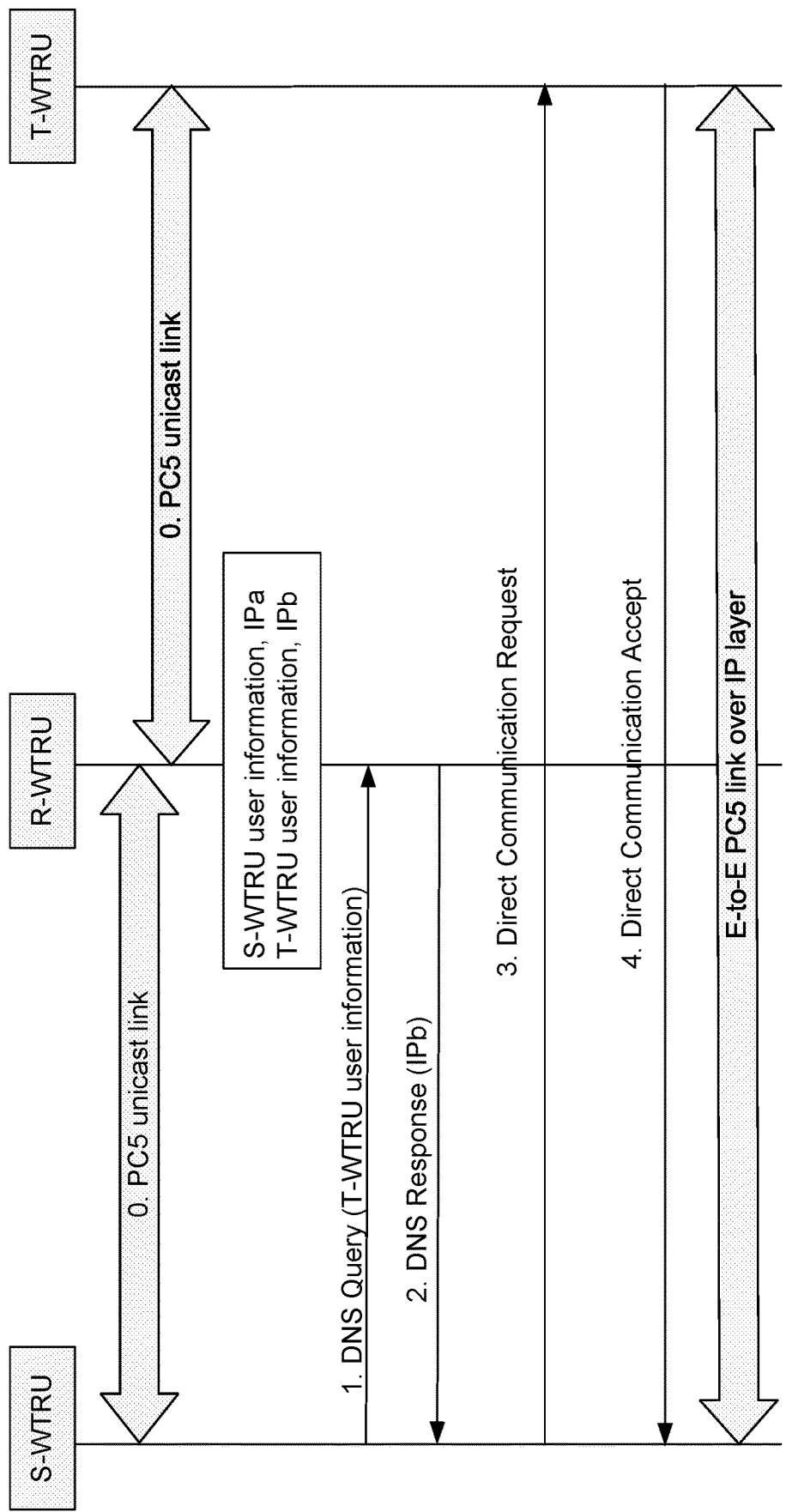
FIG. 8 is a diagram illustrating example operations associated with establishing an end-to-end PC5 unicast link.

FIG. 8 illustrates example operations associated with establishing an E-to-E PC5 unicast link. As shown, an S-WTRU may, at 1 and 2, retrieve the IP address of a T-WTRU via a DNS query and a DNS response. At 3, the S-WTRU may encapsulate a direct communication request (DCR) message into an IP packet. The source IP address (e.g., for the S-WTRU) is shown in the figure as IPa, and the target IP address (e.g., for the T-WTRU) is shown in the figure as IPb. The S-WTRU may send the DCR message (e.g., encapsulated within the IP packet) over a PC5 unicast link to an R-WTRU that is associated with the S-WTRU and a T-WTRU. The R-WTRU may forward the encapsulated DCR message to the T-WTRU, for example, based on IP routing over a unicast PC5 link with the T-WTRU. The S-WTRU and the T-WTRU may use a generic routing encapsulation (GRE) protocol, for example, to encapsulate one or more PC5 signaling (PC5-S) messages. Information such as tunneling protocol capability/preferences (e.g., GRE, IP, etc.) may be provided to the R-WTRU, for example, during link establishment between the S-WTRU and the R-WTRU and/or between the T-WTRU and the R-WTRU. The R-WTRU may store the information locally (e.g., in a corresponding DNS record or entry). A tunneling protocol capability/preference may be provided by the R-WTRU (e.g., in a DNS response) to a WTRU (e.g., the S-WTRU or T-WTRU) that may perform peer WTRU discovery (e.g., via a DNS query). A WRTU may select a preferred tunneling protocol that may be supported by a peer WTRU.

As shown in FIG. 8, at 4, the T-WTRU (e.g., after receiving the DCR message) may send a direct communication accept (DCA) message (e.g., encapsulated into an IP packet) to the S-WTRU, upon which the S-WTRU and the T-WTRU may communicate over the E-to-E PC5 unicast link between the S-WTRU and the T-WTRU that is established over an IP layer. E-to-E PC5 unicast link packets between the S-WTRU and the T-WTRU may be encapsulated into IP packets and forwarded by the R-WTRU. The E-to-E PC5 link between the S-WTRU and the T-WTRU may not include a layer of security protection (e.g., security establishment operations may be skipped, or the S-WTRU and T-WTRU may agree to not apply security protection), for example, if the PC5 links between the S-WTRU and the R-WTRU and between the R-WTRU and the T-WTRU are security-protected (e.g., with respect to confidentiality, integrity, and/or replay).

Figure 9:
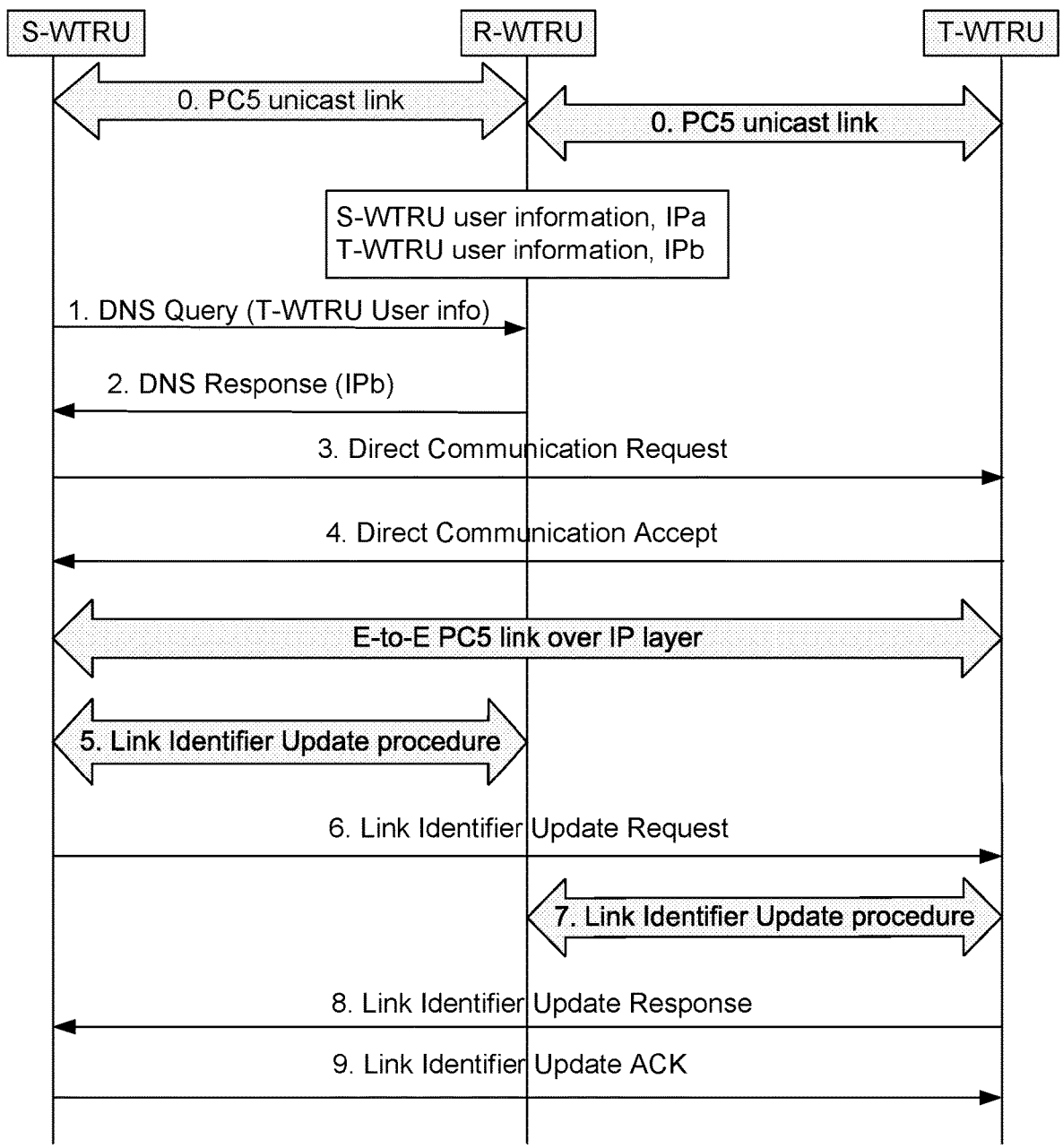
FIG. 9 is a diagram illustrating example operations associated with performing a link identifier update via an end-to-end PC5 unicast link.

FIG. 9 illustrates an example of performing a link identifier (e.g., IP address) update using an E-to-E PC5 unicast link between an S-WTRU and a T-WTRU. The operations at 1-4 of FIG. 9 may be similar (e.g., the same) as operations 1-4 of FIG. 8. So, the description of operations 1-4 is not repeated here. At 5, the S-WTRU may trigger one or more link identifier update operations (e.g., as part of a link identifier update procedure) to update the S-WTRU's link identifier(s) (e.g., including IP address) over a PC5 unicast link between the S-WTRU and an R-WTRU associated with the S-WTRU and the T-WTRU. The S-WTRU may indicate to the R-WTRU that a new IP address is to be assigned to the S-WTRU and that the old IP address of the S-WTRU is to be preserved (e.g., for at least some time). The S-WTRU may (e.g., through the operations shown in FIG. 9) obtain a new IP address (e.g., IPc) from the R-WTRU.

At 6, the S-WTRU may send a link identifier update request message over an established E-to-E PC5 unicast link to the T-WTRU. The message may be encapsulated into an IP packet, for example, with a destination IP address set to IPb and a source IP address set to IPa. The link identifier update request message may indicate the new IP address of the S-WTRU (e.g., IPc) and/or the old IP address of the S-WTRU (e.g., IPa).

At 7, the T-WTRU may decide to change its own IP address and may trigger one or more link identifier update operations (e.g., as part of a link identifier update procedure) over a PC5 unicast link between the T-WTRU and the R-WTRU. The T-WTRU may (e.g., during the update operations) obtain a new IP address (e.g., IPd) from the R-WTRU. The T-WTRU may indicate to the R-WTRU that a new IP address is to be assigned to the T-WTRU and/or that the old IP address of the T-WTRU is to be preserved (e.g., at least for some time).

At 8, the T-WTRU may send a link identifier update response message over the E-to-E PC5 unicast link to the S-WTRU. The message may be encapsulated into an IP packet, for example, with a destination IP set to IPa and a source IP address set to IPb. The link identifier update response may indicate the new IP address of the T-WTRU if the T-WTRU obtained the new IP address (e.g., IPd) at 7. The link identifier update response may also indicate the old IP address of T-WTRU (e.g., IPb).

At 9, the S-WTRU may send a link identifier update ACK message over the E-to-E PC5 unicast link to the T-WTRU. The message may be encapsulated into an IP packet, for example, with a destination IP set to IPb, and a source IP address set to IPa. The link identifier update ACK message may indicate the new IP address of the T-WTRU (e.g., IPd) and/or the old IP address of the T-WTRU (e.g., IPb), e.g., as received in the link identifier update response message.

After 9, the S-WTRU and the T-WTRU may use their newly allocated IP addresses, e.g. IPc and IPd, and may stop using their old IP addresses (e.g., IPa and IPb). The relay WTRU may release or delete the old IP addresses (e.g., after a period of inactivity), and may maintain (e.g., store) the association with the new IP addresses.

The link identifier update request, response, and acknowledgement messages (e.g., transmitted at 6, 8, and 9, respectively) may be achieved, for example, using other types of PC5 signaling, such as, for example, one or more link modification messages or one or more link IP address update messages, as discussed herein.

An S-WTRU may indicate whether another WTRU (e.g., a relay WTRU) is authorized to share the S-WTRU's IP address (e.g., with one or more T-WTRUs). For example, the S-WTRU may indicate to the relay WTRU whether the relay WTRU may share the S-WTRU's IP address with other WTRUs without authorization by the S-WTRU. The S-WTRU may provide information to the relay WTRU to allow the relay WTRU to verify whether a requesting WTRU is authorized to receive the S-WTRU's IP address. The R-WTRU may also need to be authorized (e.g., via DNS query authorization) before the R-WTRU can disclose a T-WTRU's IP address to an S-WTRU (e.g., in response to a DNS query from the S-WTRU), for example, if the T-WTRU's IP address is protected (e.g., for privacy reasons).

A DNS token (e.g., query authorization token (DQAT)) may be provisioned (e.g., pre-provisioned) to an S-WTRU. The token (e.g., DQAT) may be protected for confidentiality, integrity, and/or replay prevention (e.g., to prevent malicious retransmission of the token) purposes. The token may be for one-time use or may be re-used (e.g., for multiple times). The validity of the token may be bound by time, usage, and/or resource exhaustion (e.g., limited to certain T-WTRUs, certain number of times that the token can be used, certain time of day that the token can be used, or certain number of bytes that can be transferred with the token). The distribution of tokens (e.g., DQATs) may be facilitated out of band or in band, e.g., by an R-WTRU after or during a successful DNS query. A prior authorization as described herein (e.g., via an authorization token) may be authenticated or unauthenticated, and may be provided by an S-WTRU or a T-WTRU.

Figure 10:
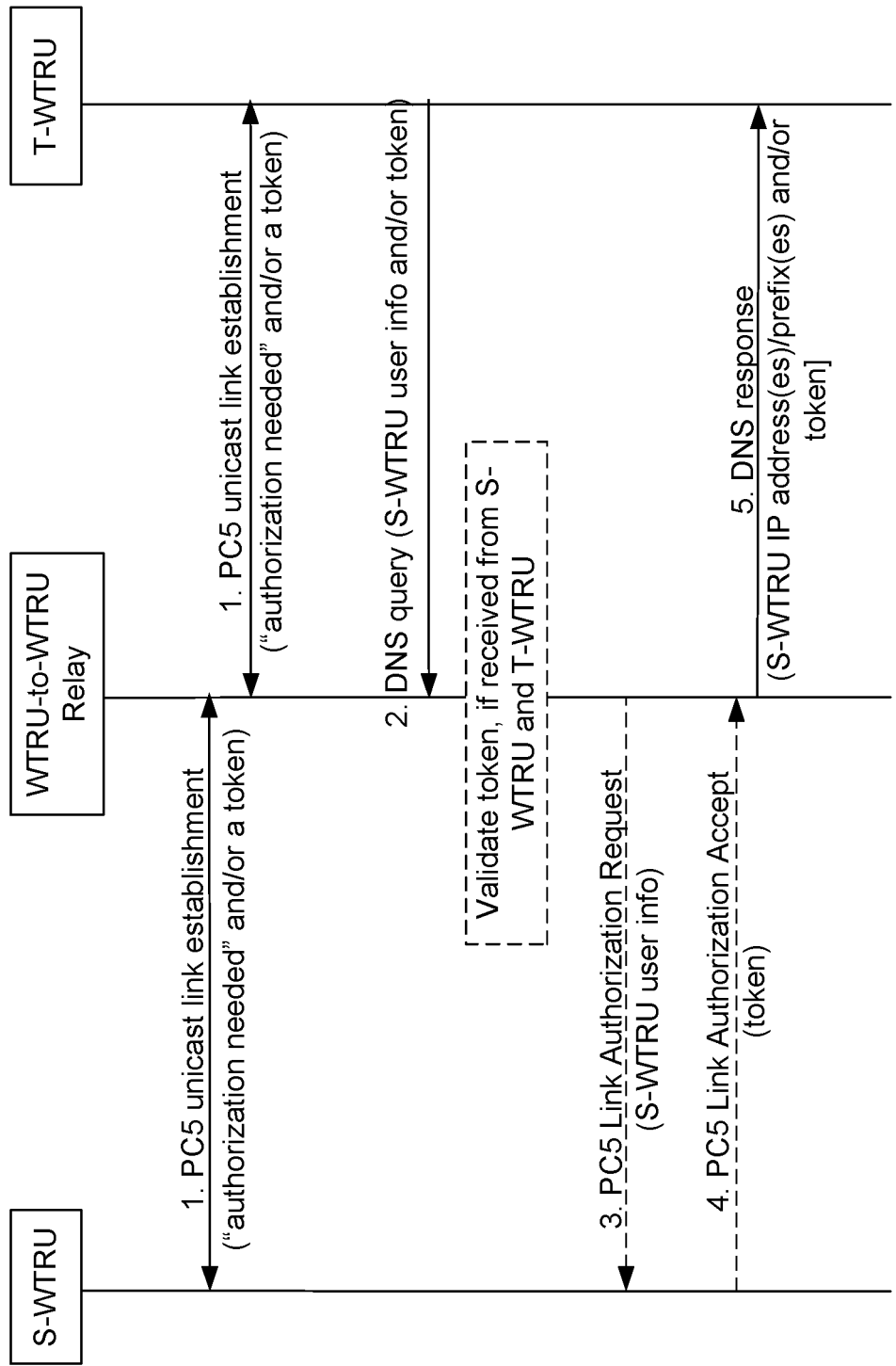
FIG. 10 is a diagram illustrating example operations associated with IP address sharing.

FIG. 10 shows example operations associated with authorizing IP address sharing. At 1, an S-WTRU may send an indication to an R-WTRU to indicate that authorization is required for the R-WTRU to share the S-WTRU's IP address. The S-WTRU may send a token to the relay WTRU (e.g., together with the authorization indication) for the relay WTRU to use to verify queries about the S-WTRU's IP address. The S-WTRU may send the indication and/or the token to the R-WTRU, for example, during PC5 link establishment and/or PC5 link modification with the R-WTRU. The S-WTRU may send an indication to the R-WTRU to indicate that no authorization is required for the R-WTRU to the share the S-WTRU's IP address with other WTRUs. A default setting (e.g., if no indication is provided by the S-WTRU) may be that authorization is required for the R-WTRU to share the S-WTRU's IP address.

A token as described herein may be authenticated. For example, a token may be valid for only certain R-WTRUs and/or certain usage by the R-WTRUs that are associated with (e.g., bound to) the token ID (e.g., similar to an airline ticket that is valid only for the person on the ticket). A token as described herein may be unauthenticated. For example, a token may be valid for use by any R-WTRU and/or may be limited in use by other conditions such as the number of utilizations (e.g., once, twice, N-times, for the current month, etc.). A relay WTRU may keep track of the indication(s) and/or token(s) provided by a WTRU (e.g., an S-WTRU or a T-WTRU), for example, together with the WTRU's user information, IP address, and/or PC5 related information. One or more of the operations described herein with reference to an S-WTRU (e.g., between the S-WTRU and an R-WTRU) may also be performed for a T-WTRU (e.g., between the T-WTRU and an R-WTRU).

At 2, the relay WTRU may receive a DNS query message from a T-WTRU (e.g., together with a token) that specifies user information associated with an S-WTRU. The relay WTRU may fetch (e.g., look up) information about the S-WTRU in response to receiving the query message (e.g., based on the user information provided by the T-WTRU). The relay WTRU may determine, e.g., based on the fetched information, that authorization is needed for the S-WTRU (e.g., an authorization needed indication may have been received or set). The relay WTRU may (e.g., if a token is received from the T-WTRU on the DNS query) validate the token received from the T-WTRU with a token received from and/or saved for the S-WTRU. If the tokens match, the relay WTRU may send a DNS response to the T-WTRU with the S-WTRU's IP address. If the tokens do not match, the relay WTRU may send no response to the T-WTRU or may indicate to the T-WTRU that it is not authorized to receive the S-WTRU's IP address.

At 3, the relay WTRU may (e.g., if no token is received from the T-WTRU or no token has been provided by the S-WTRU) send a PC5 message (e.g., a link authorization request) to the S-WTRU, for example, requesting authorization to share the S-WTRU's IP address with the T-WTRU. The link authorization request may include parameters such as the T-WTRU's user information, the T-WTRU's IP address, and/or the token (e.g., if any) received on the DNS query.

At 4, the S-WTRU may receive the link authorization request and may reply with a PC5 link authorization accept or reject message (e.g., with parameters such as the T-WTRU's user information). The S-WTRU may also provide a token to the R-WTRU that may be used by the R-WTRU to determine whether future DNS queries about the S-WTRU are authorized. The S-WTRU may decide to grant or reject the authorization based on policies set up by the S-WTRU and/or network, authorization received from an application layer, etc.

If authorization is obtained by the R-WTRU (e.g., if the tokens from the S-WTRU and the T-WTRU match, or if the authorization request is accepted by the S-WTRU), the relay WTRU may, at 5, send a DNS response to the T-WTRU with the S-WTRU's IP address. If the authorization is not obtained (e.g., if the tokens do not match or if the authorization request is rejected by the S-WTRU), the relay WTRU may send no response to the T-WTRU or may indicate to the T-WTRU that it is not authorized to receive the S-WTRU's IP address. The R-WTRU may keep track of the token(s) provided by the S-WTRU and may send the token(s) to the T-WTRU. The T-WTRU may use the token(s) for sending future query messages (e.g., DNS query messages) to discover the S-WTRU's IP address.

One or more of the DNS messages described herein (e.g., DNS query messages) may be sent over a control plane. For example, if an S-WTRU and a T-WTRU are configured to communicate via a R-WTRU as discussed herein, a user plane may not be protected for confidentiality (e.g., messages may not be encrypted). In those cases, the IP address of a source WTRU may be used to track the source WTRU (e.g., since the source WTRU's IP address may be sent to a malicious WTRU that queried the source WTRU's IP address using DNS). In these situations, even if the source WTRU periodically changes its IP address, it may still be tracked by the malicious WTRU (e.g., by looking at DNS messages sent by other WTRUs and/or data traffic to/from the source WTRU).

To prevent a source WTRU from being tracked or otherwise compromised, WTRUs may be configured to send DNS messages over a control plane interface (e.g., as PC5-S messages). An application layer may interface with a lower layer (e.g., a ProSe layer) to send or receive DNS messages. The ProSe layer may send PC5-S DNS messages over the control plane, which may be protected for confidentiality (e.g., the message may be encrypted). The ProSe layer may pass received PC5-S DNS messages up to the application layer. This way, a malicious WTRU may not be able to learn another WTRU's IP address by listening to DNS queries and/or responses messages associated with the other WTRU.

One or more of the DNS messages described herein (e.g., DNS query messages) may be transmitted or received over a specific confidentiality-protected user plane bearer. Different bearers and or LCIDs may be used at a user plane interface. For example, a first bearer and/or LCID that is confidentiality-protected (e.g., encrypted) may be used for transmitting or receiving DNS messages, and a second bearer and/or LCID (e.g., which may or may not be confidentiality-protected) may be used to transmit or receive other data traffic (e.g., non-DNS traffic). Whether a bearer or an LCID is confidentiality-protected or not may be determined based on user plane security negotiations (e.g., during link establishment).

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

What is claimed:

1. A wireless transmit receive unit (WTRU) configured to act as a relay between a first WTRU and a second WTRU, the WTRU comprising:
a processor configured to:
receive a link identifier update request from the first WTRU, wherein the link identifier update request indicates a request for a new to change a first internet protocol (IP) address, the link identifier update request further including a request to update the second WTRU about the new IP address of the first WTRU;
determine the new IP address for the first WTRU in response to receiving the link identifier update request;
send a relay update request to the second WTRU, wherein the relay update request indicates the new IP address determined for the first WTRU; and
send a link identifier update response to the first WTRU, wherein the link identifier update response indicates the new IP address determined for the first WTRU.

2. The WTRU of claim 1, wherein the link identifier update request further includes identification information associated with the second WTRU, and wherein the processor is configured to send the relay update request to the second WTRU based on the identification information associated with the second WTRU.

3. The WTRU of claim 2, wherein the identification information associated with the second WTRU includes at least one of an IP identifier of the second WTRU or application layer information associated with the second WTRU.

4. The WTRU of claim 1, wherein, prior to sending the link identifier update response to the first WTRU, the processor is further configured to receive a message from the second WTRU that acknowledges reception of the new IP address determined for the first WTRU.

5. The WTRU of claim 1, wherein the processor is further configured to receive a message from the first WTRU that acknowledges reception of the new IP address determined for the first WTRU.

6. The WTRU of claim 1, wherein the processor is further configured to receive, from the first WTRU, an IP packet that uses the new IP address, and wherein the processor is further configured to forward the IP packet to the second WTRU.

7. The WTRU of claim 1, wherein the link identifier update request comprises a token, and wherein the processor being configured to send the relay update request to the second WTRU comprises the processor being configured to:
receive a query from the second WTRU regarding the new IP address determined for the first WTRU;
validate the query based on the token; and
send the relay update request to the second WTRU in response to successfully validating the query based on the token.

8. The WTRU of claim 1, wherein the processor being configured to send the relay update request to the second WTRU comprises the processor being configured to:
receive a query from the second WTRU regarding the new IP address determined for the first WTRU; and
send the relay update request to the second WTRU in response to receiving the query.

9. A method implemented by a wireless transmit receive unit (WTRU) configured to act as a relay between a first WTRU and a second WTRU, the method comprising:
receiving a link identifier update request from the first WTRU, wherein the link identifier update request indicates a request for a new internet protocol (IP) address, the link identifier update request further including a request to update the second WTRU about the new IP address of the first WTRU;
determining the new IP address for the first WTRU in response to receiving the link identifier update request;
sending a relay update request to the second WTRU, wherein the relay update request indicates the new IP address determined for the first WTRU; and
sending a link identifier update response to the first WTRU, wherein the link identifier update response indicates the new IP address determined for the first WTRU.

10. The method of claim 9, wherein the link identifier update request further includes identification information associated with the second WTRU, the identification information comprising at least one of an IP identifier of the second WTRU or application layer information associated with the second WTRU, and wherein the relay update request is sent to the second WTRU based on the identification information associated with the second WTRU.

11. The method of claim 9, further comprising receiving a message from the second WTRU that acknowledges reception of the new IP address determined for the first WTRU.

12. The method of claim 9, further comprising receiving a message from the first WTRU that acknowledges reception of the new IP address determined for the first WTRU.

13. The method of claim 9, further comprising receiving, from the first WTRU, an IP packet that uses the new IP address, and forwarding the IP packet to the second WTRU.

14. The method of claim 9, wherein the link identifier update request comprises a token, and wherein sending the relay update request to the second WTRU comprises:
   receiving a query from the second WTRU regarding the new IP address determined for the first WTRU;
   validating the query based on the token; and
   sending the relay update request to the second WTRU in response to successfully validating the query based on the token.

15. The method of claim 9, wherein sending the relay update request to the second WTRU comprises: receiving a query from the second WTRU regarding the new IP address determined for the first WTRU; and sending the relay update request to the second WTRU in response to receiving the query.

* * * * *